United States Patent
Youn et al.

(10) Patent No.: US 12,452,524 B2
(45) Date of Patent: Oct. 21, 2025

(54) ELECTRONIC DEVICE FOR CROPPING SUBJECT WITHIN IMAGE FRAMES AND METHOD THEREOF

(71) Applicant: SAMSUNG ELECTRONICS CO., LTD., Suwon-si (KR)

(72) Inventors: Sungwook Youn, Suwon-si (KR); Yanggeun Oh, Suwon-si (KR); Woojhon Choi, Suwon-si (KR); Byungjun Son, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 77 days.

(21) Appl. No.: 18/454,064

(22) Filed: Aug. 23, 2023

(65) Prior Publication Data

US 2024/0179399 A1 May 30, 2024

Related U.S. Application Data

(63) Continuation of application No. PCT/KR2023/012304, filed on Aug. 18, 2023.

(30) Foreign Application Priority Data

Nov. 25, 2022 (KR) .................. 10-2022-0160963
Jan. 19, 2023 (KR) .................. 10-2023-0008367

(51) Int. Cl.
*H04N 23/63* (2023.01)
*G06T 7/246* (2017.01)
(Continued)

(52) U.S. Cl.
CPC .......... *H04N 23/632* (2023.01); *G06T 7/246* (2017.01); *H04N 5/2628* (2013.01); *H04N 23/61* (2023.01);
(Continued)

(58) Field of Classification Search
CPC .......... G06T 2207/20132; G06T 7/246; H04N 23/61; H04N 23/611; H04N 23/632; H04N 23/635; H04N 23/667; H04N 5/2628

See application file for complete search history.

(56) References Cited

U.S. PATENT DOCUMENTS 8,421,887 B2  4/2013 Yokohata
9,736,356 B2  8/2017 Nonaka
(Continued)

FOREIGN PATENT DOCUMENTS

JP  2011048116 A  3/2011
JP  2017194787 A  * 10/2017
(Continued)

OTHER PUBLICATIONS

International Search Report mailed Dec. 12, 2023 and Written Opinion for PCT/KR2023/012304.

*Primary Examiner* — Antoinette T Spinks
(74) *Attorney, Agent, or Firm* — CANTOR COLBURN LLP

(57) ABSTRACT

An electronic device includes a display, a camera, and a processor. The processor receives, while displaying a preview image through the display based on at least portion of image frames obtained through the camera, an input with respect to a preset button. The processor switches to an auto framing mode in response to the photographing input. The processor identifies a first area matched to a subject captured by the camera, and a second area including a preset portion of the subject in the first area. The processor, based on predicting a moving direction of the subject in the image frames by a position of the second area in the first area, displays the preview image by performing cropping with respect to at least one of the image frames.

20 Claims, 9 Drawing Sheets

(51) Int. Cl.
    *H04N 5/262*     (2006.01)
    *H04N 23/61*     (2023.01)

(52) U.S. Cl.
    CPC . *H04N 23/635* (2023.01); *G06T 2207/20132* (2013.01)

(56) References Cited

U.S. PATENT DOCUMENTS

| | | |
|---|---|---|
| 9,781,350 B2 | 10/2017 | Gao et al. |
| 10,451,705 B2 | 10/2019 | Irie |
| 10,819,911 B2 | 10/2020 | Ryu et al. |
| 11,700,452 B2 | 7/2023 | Xu et al. |
| 11,790,541 B2 | 10/2023 | Yoon et al. |
| 12,118,062 B2 | 10/2024 | Lee et al. |
| 2021/0407103 A1 | 12/2021 | Tang et al. |
| 2022/0138493 A1 | 5/2022 | Lee et al. |
| 2023/0074962 A1 | 3/2023 | Jeon et al. |
| 2023/0188845 A1 | 6/2023 | Youn et al. |

FOREIGN PATENT DOCUMENTS

| | | |
|---|---|---|
| JP | 6395381 B2 | 9/2018 |
| JP | 2021192498 A | 12/2021 |
| KR | 20050067582 A | 7/2005 |
| KR | 20180089976 A | 8/2018 |
| KR | 101983725 B1 | 9/2019 |
| KR | 20200050553 A | 5/2020 |
| KR | 20220017298 A | 2/2022 |
| KR | 20220059194 A | 5/2022 |
| KR | 20220129905 A | 9/2022 |
| KR | 20220151451 A | 11/2022 |

\* cited by examiner

ELECTRONIC DEVICE FOR CROPPING SUBJECT WITHIN IMAGE FRAMES AND METHOD THEREOF

CROSS-REFERENCE TO RELATED APPLICATIONS

This application is a continuation of International Application No. PCT/KR2023/012304 designating the United States, filed on Aug. 18, 2023, in the Korean Intellectual Property Receiving Office and claiming priority to Korean Patent Application Nos. 10-2022-0160963, filed on Nov. 25, 2022, and 10-2023-0008367, filed on Jan. 19, 2023, in the Korean Intellectual Property Office, the disclosures of each of which are incorporated by referenced herein in their entireties.

TECHNICAL FIELD

The present disclosure relates to an electronic device for cropping a subject within image frames and a method thereof.

BACKGROUND ART

An electronic device may obtain a plurality of images through a camera. The electronic device may enlarge or reduce the images while displaying the plurality of obtained images on the screen.

DISCLOSURE

Technical Solution

According to an embodiment, an electronic device may include a display, a camera, and a processor. The electronic device may receive, while displaying a preview image through the display based on at least portion of image frames obtained through the camera, an input with respect to a preset button. The processor may switch to auto framing mode in response to the input. The electronic device may identify a first area matched to a subject captured by the camera, and a second area including a preset portion of the subject in the first area. The electronic device may, based on predicting moving direction of the subject in the image frames indicated by a position of the second area in the first area, display the preview image by performing cropping with respect to at least one of the image frames.

According to an embodiment, a method of an electronic device may comprise receiving, while displaying a preview image through the display based on at least portion of image frames obtained through the camera, an input with respect to a preset button. The method of the electronic device may comprise switching to an auto framing mode in response to the photographing input. The method of the electronic device may comprise identifying a first area matched to a subject captured by the camera, and a second area including a preset portion of the subject in the first area. The method of the electronic device may comprise, based on predicting a moving direction of the subject in the image frames indicated by a position of the second area in the first area, displaying the preview image by performing cropping with respect to at least one of the image frames.

According to an embodiment, a computer-readable storage medium storing one or more programs, where the one or more programs, when executed by a processor of an electronic device, may cause the processor to receive, while displaying a preview image through the display based on at least portion of image frames obtained through the camera, an input with respect to a preset button. The one or more programs, when executed by the processor of the electronic device, may cause the processor of the electronic device to switch to an auto framing mode in response to the input. The one or more programs, when executed by the processor of the electronic device, may cause the processor of the electronic device to identify a first area matched to a subject captured by the camera, and a second area including a preset portion of the subject in the first area. The one or more programs, when executed by the processor of the electronic device, may cause the processor of the electronic device to, based on predicting a moving direction of the subject in the image frames indicated by a position of the second area in the first area, display the preview image by performing cropping with respect to at least one of the image frames.

MODE FOR INVENTION

Figure 1:
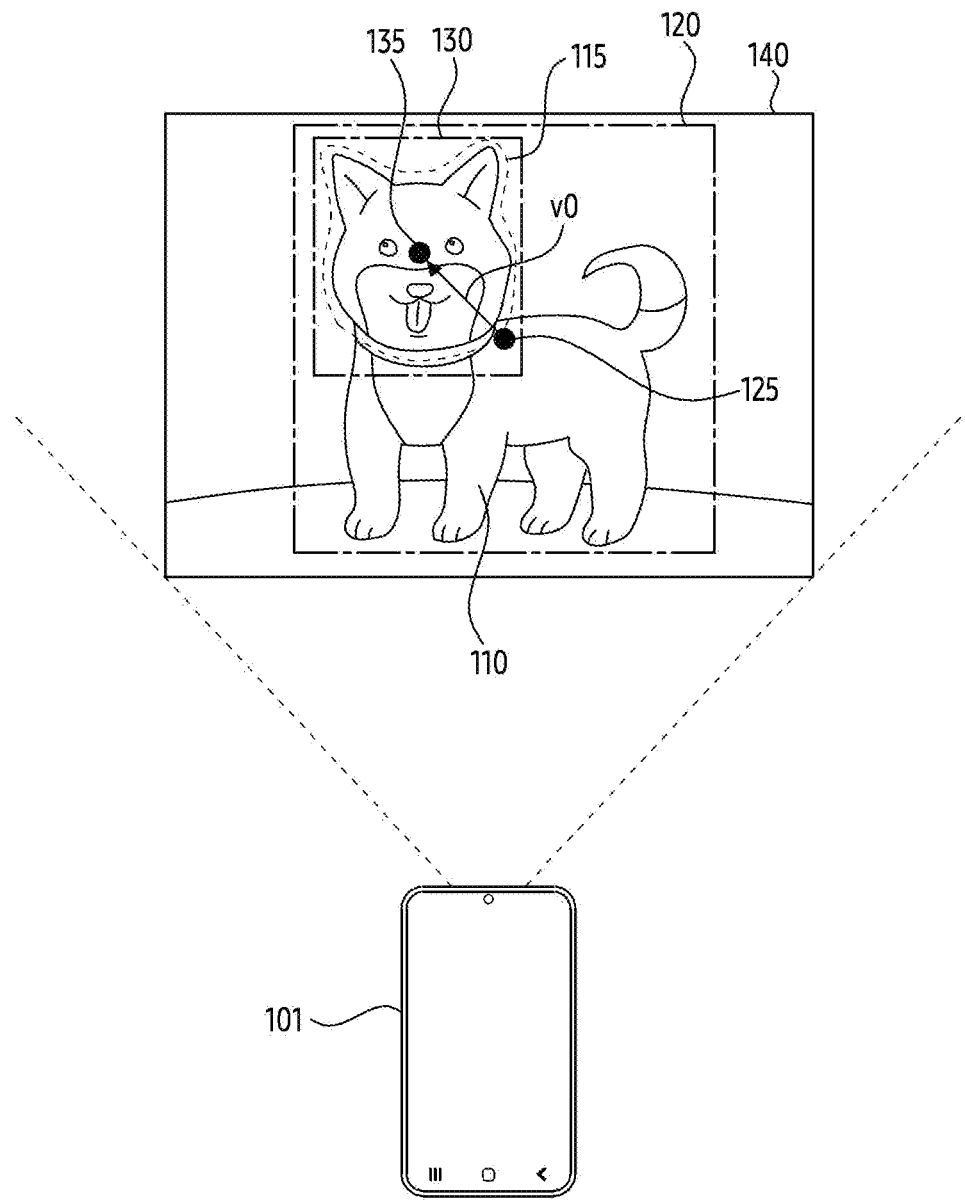
FIG. 1 illustrates an example of an electronic device that obtains a video through a camera, according to an embodiment.

Hereinafter, various embodiments of the present document will be described with reference to the accompanying drawings.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 illustrates an example of an electronic device that obtains a video through a camera, according to an embodiment. An electronic device 101 of FIG. 1 may include a terminal that is owned by a user. For example, the terminal may include a personal computer (PC) such as a laptop and a desktop, a smart accessory such as a smartphone, a smartpad, a tablet PC, smartwatch, and head-mounted device (HMD).

According to an embodiment, the electronic device 101 may include the camera. The electronic device 101 may include a display. The electronic device 101 may obtain the video including a plurality of image frames through the camera. An image frame 140 of FIG. 1 may include at least a portion of the plurality of image frames obtained through the camera.

According to an embodiment, the electronic device 101 may display a preview image through the display based on at least a portion of image frames obtained through the camera. The electronic device 101 may operate in an "auto framing mode" while displaying the preview image. The following operations may be operations performed in the auto framing mode. For example, the electronic device 101 may operate in the auto framing mode based on an input with respect to a button for performing the auto framing. For example, the auto framing mode may be a mode that automatically tracks a subject 110 identified in the image frames. For example, the auto framing mode may be a mode for enlarging the subject 110 or cropping an area including the subject 110 in order to emphasize the subject 110 identified in the image frames. For example, the auto framing mode may be a function of performing cropping with respect to a single subject. For example, the electronic device 101 may operate in the auto framing mode in response to an input with respect to a preset button. The electronic device 101 may identify the subject 110 captured by the camera in the auto framing mode. The electronic device 101 may identify a first area 120 matched to the subject 110. For example, the first area 120 may be an area including the subject 110. For example, the first area 120 may include the subject 110 and may have a polygon shape such as a quadrangle. The electronic device 101 may identify a second area 130 including a preset portion 115 of the subject 110 in the first area 120. For example, the preset portion 115 may include a head of the subject 110 when the subject 110 is an animal or a human. For example, the electronic device 101 may identify a direction in which the head of the subject 110 faces. The electronic device 101 may predict (or estimate) a moving direction of the subject 110 based on the direction in which the head faces. For example, the direction in which the head faces may be a direction in which the gaze of the subject 110 (e.g., animal or human) faces.

According to an embodiment, the electronic device 101 may identify the first area 120 and the second area 130. The electronic device 101 may identify a center 125 of the first area 120 and a center 135 of the second area 130 based on identifying the first area 120 and the second area 130. The electronic device 101 may identify a position of the second area 130 in the first area 120 based on identifying the center 125 of the first area 120 and the center 135 of the second area 130. The electronic device 101 may identify a direction indicated by the position of the second area 130 in the first area 120 based on identifying the position of the second area 130 in the first area 120. For example, the electronic device 101 may identify a vector v0 extended from the center 125 of the first area 120 to the center 135 of the second area 130. The electronic device 101 may predict the moving direction of the subject 110 based on identifying the vector v0. The electronic device 101 may track the subject 110 identified in the image frames based on predicting the moving direction of the subject 110. For example, the electronic device 101 may identify the subject 110 in an area corresponding to the moving direction based on predicting the moving direction. The electronic device 101 may perform cropping with respect to at least one of the image frames, by tracking the subject 110. For example, the cropping may include an operation of obtaining only at least a portion of image frames. The electronic device 101 may obtain a video corresponding to the photographing input by performing the cropping.

As described above, according to an embodiment, the electronic device 101 may obtain a plurality of image frames and/or images through the camera. The electronic device 101 may display the preview image through the display based on at least a portion of the image frames. The electronic device 101 may receive the input with respect to the preset button while displaying the preview image. The electronic device 101 may identify the first area 120 matched to the subject 110 captured by the camera, based on receiving the input. The electronic device 101 may identify the second area 130 including the preset portion 115 of the captured subject 110. The electronic device 101 may identify the position of the second area 130 in the first area 120. The electronic device 101 may identify the vector v0 extended from the center 125 of the first area 120 to the center 135 of the second area 130. The electronic device 101 may predict the moving direction of the subject 110 based on identifying the vector v0. The electronic device 101 may perform cropping with respect to an area corresponding to the moving direction based on predicting the moving direction. The electronic device 101 may display a preview image corresponding to the input based on performing the cropping. The electronic device 101 may obtain a video as the preview image by performing the cropping based on predicting the moving direction of the subject 110 indicated by the position of the second area 130 in the first area 120. The electronic device 101 may obtain the video in which the subject 110 is positioned at the center of the video by tracking the subject 110 and performing the cropping based on predicting the moving direction of the subject 110.

Figure 2:
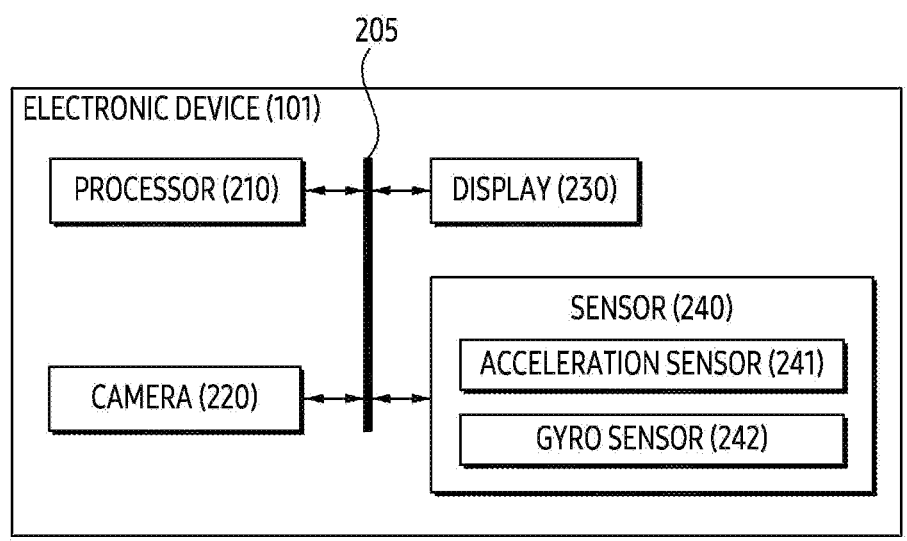
FIG. 2 illustrates an example of a block diagram of an electronic device according to an embodiment.

FIG. 2 illustrates an example of a block diagram of an electronic device according to an embodiment. An electronic device 101 of FIG. 2 may include the electronic device 101 of FIG. 1.

Referring to FIG. 2, according to an embodiment, the electronic device 101 may include at least one of a processor 210, a camera 220, a display 230, or a sensor 240. The processor 210, the camera 220, the display 230, and the sensor 240 may be electronically and/or operably coupled with each other by an electronical component such as a communication bus 205. Hereinafter, that hardware is operably coupled with each other may mean that a direct or indirect connection between hardware is established by wire or wirelessly so that a second hardware is controlled by a first hardware among the hardware. Although illustrated in different blocks, the embodiment is not limited thereto. Some of the hardware of FIG. 2 may be included in a single integrated circuit such as a system on a chip (SoC). The type and/or number of hardware included in the electronic device 101 is not limited to that illustrated in FIG. 2. For example, the electronic device 101 may include only some of the hardware illustrated in FIG. 2.

According to an embodiment, the electronic device 101 may include hardware for processing data based on one or more instructions. The hardware for processing data may include the processor 210. For example, the hardware for processing data may include an arithmetic and logic unit (ALU), a floating point unit (FPU), a field programmable gate array (FPGA), a central processing unit (CPU) and/or application processor (AP). The processor 210 may have a structure of single-core processor, or may have a structure of a multi-core processor such as a dual core, a quad core, or a hexa core.

According to an embodiment, the camera 220 of the electronic device 101 may include a lens assembly, a flash, or an image sensor. The lens assembly may collect light emitted from a subject (e.g., a subject 110 of FIG. 1) that is an object of image photographing. The lens assembly may include one or more lenses. According to an embodiment, the camera 220 may include a plurality of lens assemblies. For example, in the camera 220, some of the plurality of lens assemblies may have the same lens property (e.g., angle of view, focal distance, automatic focus, f number, or optical zoom), or at least one lens assembly may have one or more lens properties different from the lens properties of another lens assembly. The lens assembly may include a wide-angle lens or a telephoto lens. For example, the flash of the camera 220 may emit light used to enhance light emitted or reflected from the subject. According to an embodiment, the flash may include one or more light emitting diodes (e.g., a red-green-blue (RGB) LED, a white LED, an infrared LED, or an ultraviolet LED), or a xenon lamp. For example, the image sensor may obtain an image corresponding to the subject by converting light emitted or reflected from the subject and transmitted through the lens assembly into an electrical signal. According to an embodiment, the image sensor may include, for example, one image sensor selected from among image sensors having different property, such as a RGB sensor, a black and white (BW) sensor, an IR sensor, or a UV sensor, a plurality of image sensors having the same property, or a plurality of image sensors having different property. Each image sensor included in the image sensor may be implemented by using, for example, a charged coupled device (CCD) sensor or a complementary metal oxide semiconductor (CMOS) sensor. According to an embodiment, the electronic device 101 may include a plurality of cameras 220 having different property or function. For example, at least one of the plurality of cameras 220 may be a wide-angle camera, and the other may be a telephoto camera.

According to an embodiment, the display 230 of the electronic device 101 may output visualized information to the user. For example, the display 230 may output the visualized information to the user, by being controlled by the processor 210 including a circuit such as a graphic processing unit (GPU). The display 230 may include a flexible display, a flat panel display (FPD) and/or electronic paper. The FPD may include a liquid crystal display (LCD), a plasma display panel (PDP), and/or one or more light emitting diodes (LEDs). The LED may include an organic LED (OLED). According to an embodiment, the electronic device 101 may display image in image frames obtained through the camera 220, through the display 230. For example, the electronic device 101 may display at least a portion of the image frames, through the display 230. The electronic device 101 may display a preview image through the display 230 based on the at least a portion of the image frames.

According to an embodiment, the electronic device 101 may include the sensor 240. The sensor 240 of the electronic device 101 may include an acceleration sensor 241 and/or a gyro sensor 242. The acceleration sensor 241 of the electronic device 101 may output electrical information indicating the magnitude of the gravitational acceleration measured on each of a plurality of preset axes (e.g., x axis, y axis, and z axis) perpendicular to each other. For example, the processor 210 of the electronic device 101 may detect motion of the electronic device 101 in a physical space based on the electrical information outputted from the acceleration sensor 241. For example, the motion detected by the electronic device 101 may indicate the orientation of the electronic device 101 detected by the acceleration sensor 241.

According to an embodiment, the gyro sensor 242 of the electronic device 101 may obtain an electrical signal associated with the rotational speed of the electronic device 101 (e.g., the angular speed of the electronic device 101 with respect to preset axes). The electronic device 101 may identify the motion of the electronic device 101 based on the electrical signal obtained through the gyro sensor 242. Based on the identified motion, the electronic device 101 may store meta data associated with the motion in a video obtained through the camera 220.

According to an embodiment, the electronic device 101 may obtain data associated with the direction and/or motion of the electronic device 101 by using the sensor 240. The electronic device 101 may obtain data using the sensor 240 while obtaining image frames (or images) through the camera 220. The electronic device 101 may identify the subject in the image frames. The electronic device 101 may obtain the data using the sensor 240 while identifying the subject. While identifying the subject, the electronic device 101 may identify (or track) movement of the subject in the image frames based on identifying the data using the sensor 240. For example, the electronic device 101 may obtain a parameter associated with the data. The electronic device 101 may identify the change amount of the parameter. The electronic device 101 may identify a direction change of the camera 220 in order to identify the moving amount of the subject. For example, the moving amount of the subject may be a result value of 'pixel/frame'. The electronic device 101 may identify the change in the direction of the camera 220 of the electronic device 101 based on identifying the change amount of the parameter. The electronic device 101 may predict the movement of the identified subject in the image frames based on identifying the change in the direction. For example, the electronic device 101 may predict the moving direction of the subject based on the change in the direction of the camera 220 and the moving amount of the subject in the image frames. For example, the electronic device 101 may predict the moving direction of the subject based on the change in the direction of the camera 220 and a difference in the moving amount of the subject in the image frames. The electronic device 101 may perform cropping of the image frames based on predicting the movement of the subject. For example, the electronic device 101 may form an area with respect to the predicted moving direction based on predicting the movement. For example, the area may be referred to as a window having a preset size. The electronic device 101 may identify an external object in the area. The electronic device 101 may perform cropping with respect to an area including the external object based on identifying the external object in the area. The electronic device 101 may obtain a video as the preview image based on performing the cropping of the image frames.

According to an embodiment, the electronic device 101 may obtain the image frames through the camera 220. The electronic device 101 may obtain the images through the camera 220. The image frames and the images may be substantially the same. The electronic device 101 may display the preview image through the display 230 based on at least a portion of the image frames obtained through the camera 220. The electronic device 101 may receive a photographing input for obtaining a video while displaying the preview image. The electronic device 101 may identify a subject captured by the camera 220 in response to the photographing input. The electronic device 101 may identify a first area (e.g., a first area 120 of FIG. 1) including the subject based on identifying the subject. The electronic device 101 may identify a preset portion (e.g., a head of the subject when the subject is an animal or human) of the subject. The electronic device 101 may identify a second area (e.g., a second area 130 of FIG. 1) including the preset portion of the subject. The electronic device 101 may identify the first area matched to the subject captured by the camera 220 and the second area including the preset portion of the subject in the first area. In an embodiment, the electronic device 101 may predict a moving direction of a subject indicated by a position of the second area in the first area. For example, the electronic device 101 may obtain a vector for predicting the moving direction based on a center of the first area and a center of the second area. For example, the vector may be from the center of the first area to the center of the second area. For example, the electronic device 101 may predict the moving direction of the subject corresponding to the vector based on obtaining the vector. The electronic device 101 may perform cropping with respect to at least one of the image frames based on predicting the moving direction of the subject. For example, the electronic device 101 may generate a first window having a preset size corresponding to the moving direction. The electronic device 101 may track the subject by using the first window having the preset size. For example, the size of the image frames may be a size of 3840 pixels×2160 pixels. For example, the size of the image frames may be a size of 1920 pixels×1080 pixels. For example, the preset size may be included in the size of the image frames. For example, the electronic device 101 may perform the cropping with respect to the at least one of the image frames based on a second window having a size of 1536 pixels×864 pixels to a size of 3840 pixels×2160 pixels. The preset size is only an example and is not limited to the above description. The electronic device 101 may perform the cropping with respect to the at least one of the image frames based on the window having the preset size. For example, the electronic device 101 may display a preview image based on the cropped image frames. For example, the electronic device 101 may obtain a video including the cropped image frames including the subject.

According to an embodiment, the electronic device 101 may identify a subject in the image frame obtained through the camera. For example, the electronic device 101 may identify a subject classified to animal. For example, the electronic device 101 may identify the second area where a head of the animal is captured in the first area based on identifying the subject. The electronic device 101 may predict the moving direction and/or moving velocity of the subject based on the first area and the second area. For example, the moving velocity may be predicted based on a net moving amount (e.g., pixels/frame) between image frames. The electronic device 101 may cropping at least some of the image frames by predicting the moving direction and/or the moving velocity of the subject. The electronic device 101 may obtain a video based on cropping the at least some of the image frames.

As described above, according to an embodiment, the electronic device 101 may receive the photographing input while displaying the preview image through the display 230. In response to the photographing input, the electronic device 101 may identify the first area matched to the subject captured by the camera 220 and the second area including the preset portion of the subject in the first area. The electronic device 101 may perform the cropping with respect to the at least one of the image frames based on the moving direction of the subject in the image frames, indicated by the position of the second area in the first area. The electronic device 101 may obtain a video corresponding to the photographing input, by performing the cropping with respect to the at least one of the image frames. The electronic device 101 may predict the movement of the subject based on the moving direction. The electronic device 101 may perform the cropping with respect to the at least one of the image frames by predicting the movement of the subject. When performing the cropping, the electronic device 101 may perform cropping to an area including the subject. The electronic device 101 may obtain a video in which the movement of the subject may be smoothly reproduced, by predicting the movement of the subject and performing the cropping. The electronic device 101 may obtain a video positioned in an area in which the subject includes a central area of the screen, by performing the cropping based on predicting the movement of the subject.

Figure 3A:
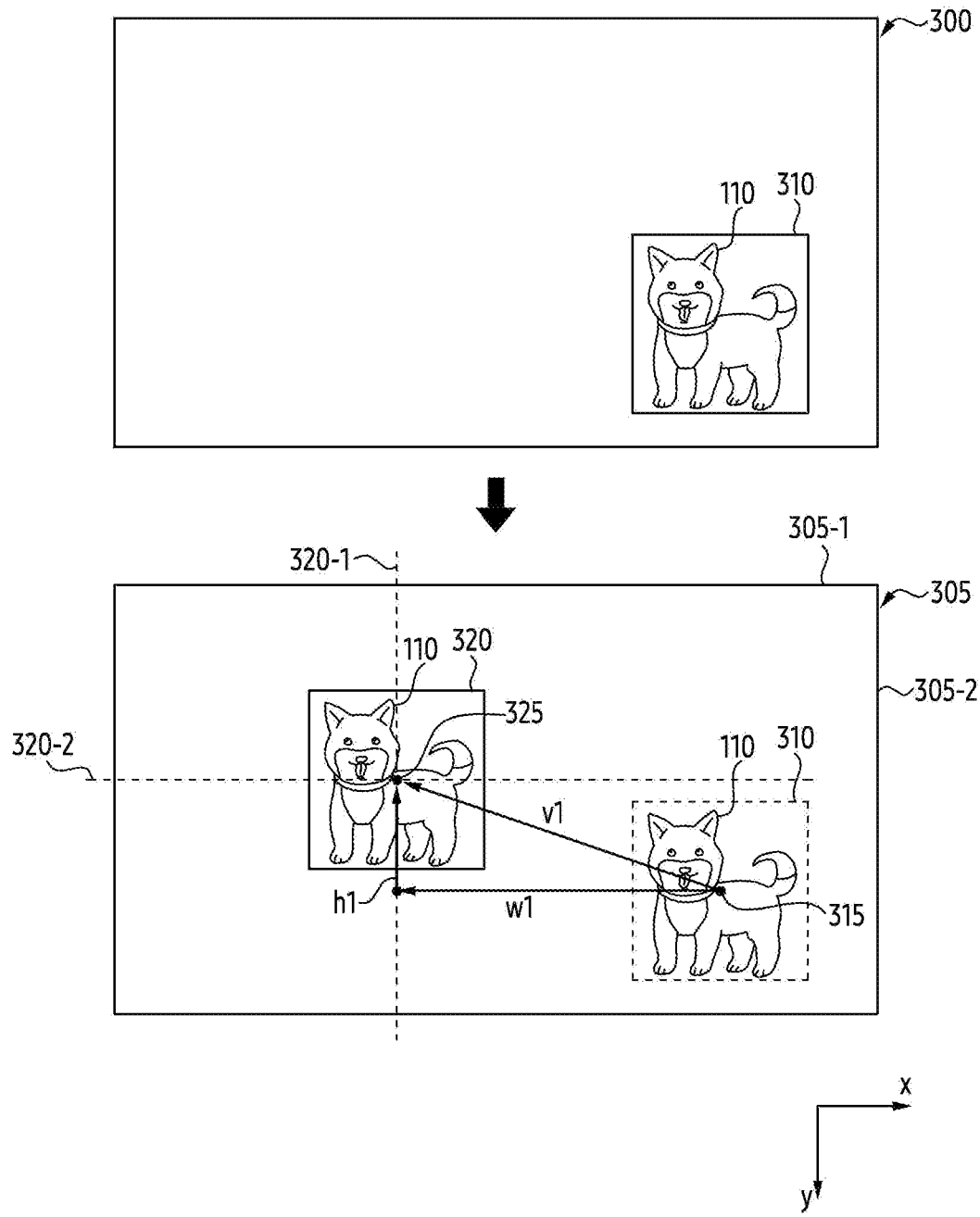
FIG. 3A illustrates an example of an electronic device for identifying a subject, according to an embodiment.
Figure 3B:
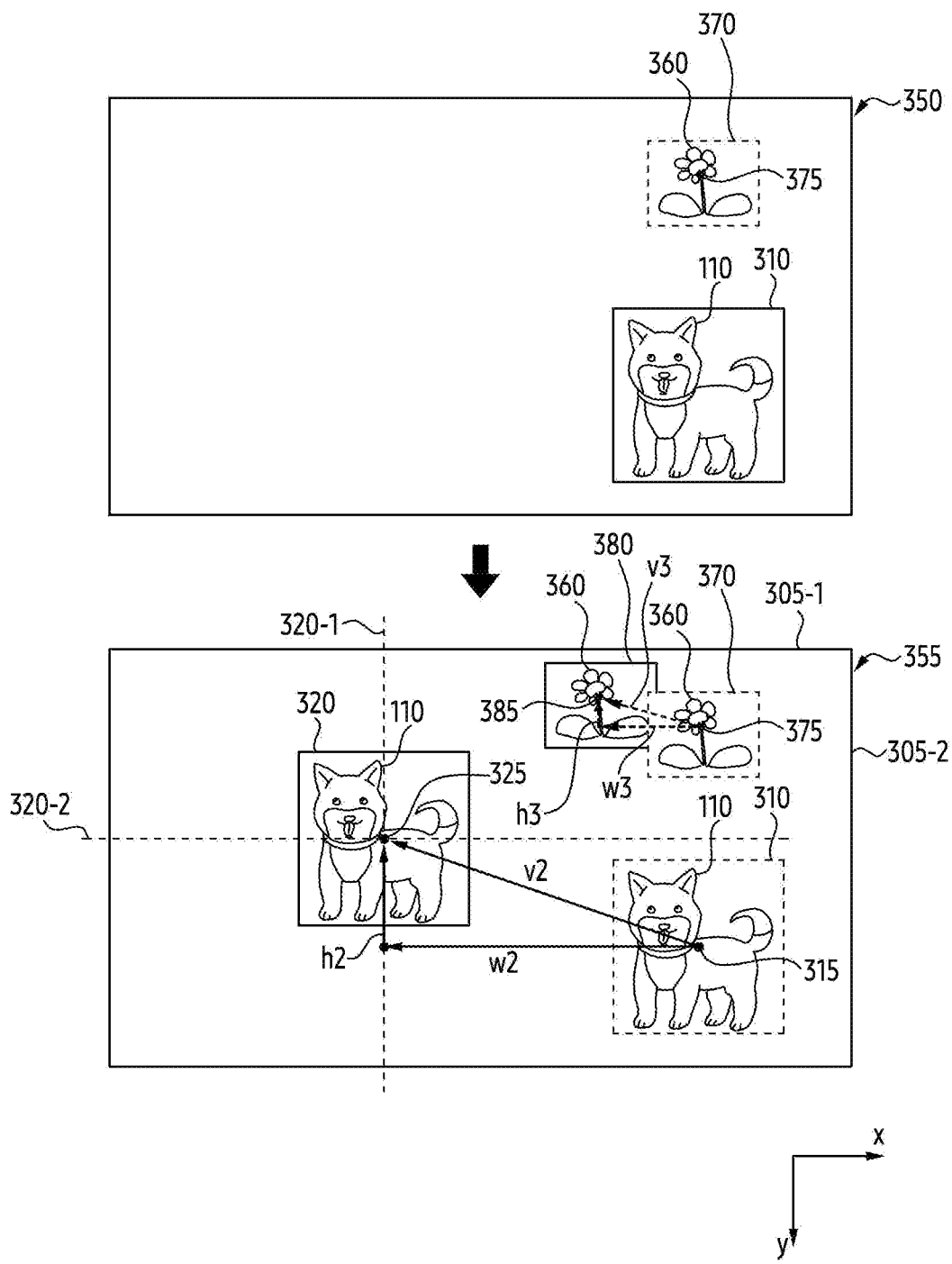
FIG. 3B illustrates an example of an electronic device for identifying a subject, according to an embodiment.

FIG. 3A illustrates an example of an electronic device for identifying a subject, according to an embodiment. FIG. 3B illustrates an example of an electronic device for identifying a subject, according to an embodiment. An electronic device 101 of FIGS. 3A and/or 3B may include the electronic device 101 of FIGS. 1 and 2. Operations of FIGS. 3A and/or 3B may be executed by a processor 210 of FIG. 2. The operations of FIGS. 3A to 3B may be operations of the electronic device 101 performed in a state that is switched to auto framing mode.

Referring to FIGS. 3A and/or 3B, according to an embodiment, the electronic device 101 may obtain image frames through a camera (e.g., a camera 220 of FIG. 2). The image frames 300, 305, 350, and 355 of FIGS. 3A and/or 3B may be at least one of the image frames obtained through the camera.

Referring to FIG. 3A, according to an embodiment, the electronic device 101 may identify a subject 110 in a first image frame 300. The electronic device 101 may identify a first area 310 that matches the subject 110, based on identifying the subject 110. According to an embodiment, the electronic device 101 may identify a second image frame 305 different from the first image frame 300. The electronic device 101 may identify the subject 110 in the second image frame 305. The electronic device 101 may identify a center 315 of the first area 310, in the first image frame 300. The electronic device 101 may identify a second area 320 that matches the subject 110, in the second image frame 305. The electronic device 101 may identify a center 325 of the second area 320. According to an embodiment, the electronic device 101 may identify a vector v1 from the center 315 of the first area 310 of the first image frame 300 to the center 325 of the second area 320 of the second image frame 305. For example, the vector v1 may be obtained based on axes from the center 325 of the second area 320 toward an edge of the image frame and the center 315 of the first area 310. For example, the electronic device 101 may identify a first axis 320-1 vertically formed from the center 325 of the second area 320 toward a first edge 305-1. The electronic device 101 may identify a second axis 320-2 horizontally formed from the center 325 of the second area 320 toward a second edge 305-2. The electronic device 101 may identify a horizontal vector w1 extending in a direction parallel to the second axis 320-2 from the center 315 of the first area 310. The electronic device 101 may identify a vertical vector h1 extending in a direction parallel to the first axis 320-1 from an end point of the horizontal vector w1. The electronic device 101 may obtain the vector v1 based on the horizontal vector w1 and the vertical vector h1. The vector v1 may be obtained based on a vector sum of the horizontal vector w1 and the vertical vector h1. For example, the first axis 320-1 and the second axis 320-2 may be perpendicular to each other.

According to an embodiment, the electronic device 101 may obtain the vector v1. The electronic device 101 may identify movement of the subject 110 based on obtaining the vector v1. The electronic device 101 may perform cropping of the image frames based on identifying the movement of the subject 110. The electronic device 101 may display a preview image based on performing the cropping of the image frames. For example, the electronic device 101 may obtain a video based on performing the cropping. For example, the electronic device 101 may display a preview image including at least a portion of the image frames.

Referring to FIG. 3B, according to an embodiment, the electronic device 101 may identify subjects 110 and 360 in an image frame 350. For example, the electronic device 101 may identify a plurality of subjects 110 and 360 in the third image frame 350. The electronic device 101 may identify the plurality of subjects 110 and 360 in the fourth image frame 355. The electronic device 101 may identify the subjects 110 and 360 moved between the image frames 350 and 355. For example, the electronic device 101 may identify the first subject 110 and the second subject 360 in the third image frame 350. The electronic device 101 may identify the first subject 110 and the second subject 360 in the fourth image frame 355. The electronic device 101 may identify movements of the first and second subjects 110 and 360. For example, the electronic device 101 may identify a positional change of the second subject 360 between the third image frame 350 and the fourth image frame 355. For example, the electronic device 101 may identify a horizontal vector w3 indicating a moving distance and direction of the second subject 360 in a horizontal direction (e.g., –x axis direction) from a center 375 of a first area 370 to a center 385 of a second area 380. The electronic device 101 may identify a vertical vector h3 indicating a moving distance and direction of the second subject 360 in a vertical direction (e.g., –y axis direction) to obtain the vector v3 as a vector sum of the horizontal vector w3 and the vertical vector h3. For example, the horizontal direction may be a direction parallel to the x axis. For example, the vertical direction may be a direction parallel to the y axis. The electronic device 101 may identify an average of the moving distance of the second subject 360 in a plurality of image frames. The electronic device 101 may identify the moving distance of the first subject 110 based on the average of the moving distance of the second subject 360. The number of subjects different from the first subject 110 for identifying the moving distance of the first subject 110 is not limited.

For example, the electronic device 101 may identify a first average of distance moved in the horizontal direction of the first subject 110 in the plurality of image frames. The electronic device 101 may identify a second average of distance moved in the horizontal direction of the second subject 360 in the plurality of image frames.

Based on Equation 1, the electronic device 101 may identify the distance that the subject 110 has actually moved by using the first average and the second average.

$$\text{move\_}W = \text{PetMV\_}W - \text{avg}(Obj\_W) \qquad \text{[Equation 1]}$$

Referring to the Equation 1, avg(Obj_W) may be the second average of the distance moved in the horizontal direction of the second subject 360 in the plurality of image frames. PetMV_W may be the first average of the distance moved in the horizontal direction of the first subject 110 in the plurality of image frames. The PetMV_W may correspond to a horizontal vector w2 of FIG. 3B. move_W may be the estimated distance actually moved in the horizontal direction of the first subject 110 in the plurality of image frames.

According to an embodiment, the electronic device 101 may identify a third average of distance moved in the vertical direction of the first subject 110 in the plurality of image frames. The electronic device 101 may identify a fourth average of distance moved in the vertical direction of the second subject 360 in the plurality of image frames. For example, based on Equation 2, the electronic device 101 may estimate the distance that the first subject 110 has actually moved by using the third average and the fourth average.

$$\text{move\_}H = \text{PetMV\_}H - \text{avg}(Obj\_H) \qquad \text{[Equation 2]}$$

Referring to the Equation 2, avg(Obj_H) may be the fourth average of distance moved in the vertical direction of the second subject 360 in the plurality of image frames. avg(Obj_H) may correspond to the vertical vector h3 of FIG. 3B. PetMV_H may be the third average of distance moved in the vertical direction of the first subject 110 in the plurality of image frames. The PetMV_H may correspond to the vertical vector h2 of FIG. 3B. move_H may be the estimated distance actually moved in the vertical direction of the first subject 110 in the plurality of image frames. According to an embodiment, the electronic device 101 may estimate the actual moving distance and the moving direction of the first subject 110 based on Equations 1 and 2. The electronic device 101 may estimate the actual moving distance and the moving direction of the first subject 110 based on the move_W in the Equation 1 and the move_H in the Equation 2. The electronic device 101 may track the first subject 110, by using a window having a preset size, based on estimating the actual moving distance and the moving direction of the first subject 110. The electronic device 101 may obtain a video having a size corresponding to the window, based on tracking the first subject 110. For example, the electronic device 101 may cropping image frames to the size corresponding to the window.

According to an embodiment, the electronic device 101 may identify the first subject 110 and the second subject 360 in the third image frame 350. The electronic device 101 may assign a first identifier corresponding to the first subject 110, based on identifying the first subject 110. The electronic device 101 may assign a second identifier corresponding to the second subject 360, based on identifying the second subject 360. According to an embodiment, the electronic device 101 may track subjects to which the identifiers are assigned, based on assigning the identifiers (e.g., the first identifier and/or the second identifier). For example, the electronic device 101 may predict movement of subjects to which the identifiers are assigned, based on the operations of FIGS. 3 to 4B. The electronic device 101 may perform cropping with respect to an area including the subjects, based on predicting the movement of the subjects. The electronic device 101 may obtain a video as the preview image, based on performing the cropping.

According to an embodiment, the electronic device 101 may identify the subjects 110 and 360 in the image frame 350. For example, the electronic device 101 may identify the first subject 110 and the second subject 360. The electronic device 101 may identify a feature point of the first subject 110. The electronic device 101 may identify a feature point of the second subject 360. According to an embodiment, the electronic device 101 may identify moving direction associated with the feature points of the subjects 110 and 360 in the image frames 350 and 355, based on identifying the feature points of the subjects 110 and 360. For example, the electronic device 101 may identify the moving direction associated with the feature point of the second subject 360, based on identifying the feature point of the second subject 360. The electronic device 101 may track the first subject 110 based on identifying the moving direction associated with the feature point of the second subject 360. For example, the electronic device 101 may track the first subject 110 by using the window having the preset size. The electronic device 101 may cropping at least some of the windows of the preset size while tracking the subject by using the window having the preset size. The electronic device 101 may obtain a video obtained by cropping at least some of the windows having the preset size.

As described above, according to an embodiment, the electronic device 101 may identify the positions of the first subject 110 and the second subject 360 in the plurality of image frames. The electronic device 101 may identify vectors based on a positional change of the first subject 110 identified in the plurality of image frames. The electronic device 101 may obtain a fifth average of a plurality of vectors associated with the first subject 110. The electronic device 101 may identify vectors based on a positional change of the second subject 360 identified in the plurality of image frames. The electronic device 101 may obtain a sixth average of vectors associated with the second subject 360.

The electronic device 101 may estimate the actual moving distance and the moving direction of the first subject 110, based on the fifth average and the sixth average. The electronic device 101 may perform cropping of the plurality of image frames based on estimating the actual moving distance and the moving direction of the first subject 110. The electronic device 101 may obtain a video as the preview image based on performing the cropping of the plurality of image frames. The electronic device 101 may obtain a video in which the movement of the first subject 110 is smoothly reproduced by predicting the moving distance and the moving direction of the first subject 110 and performing cropping.

Figure 4A:
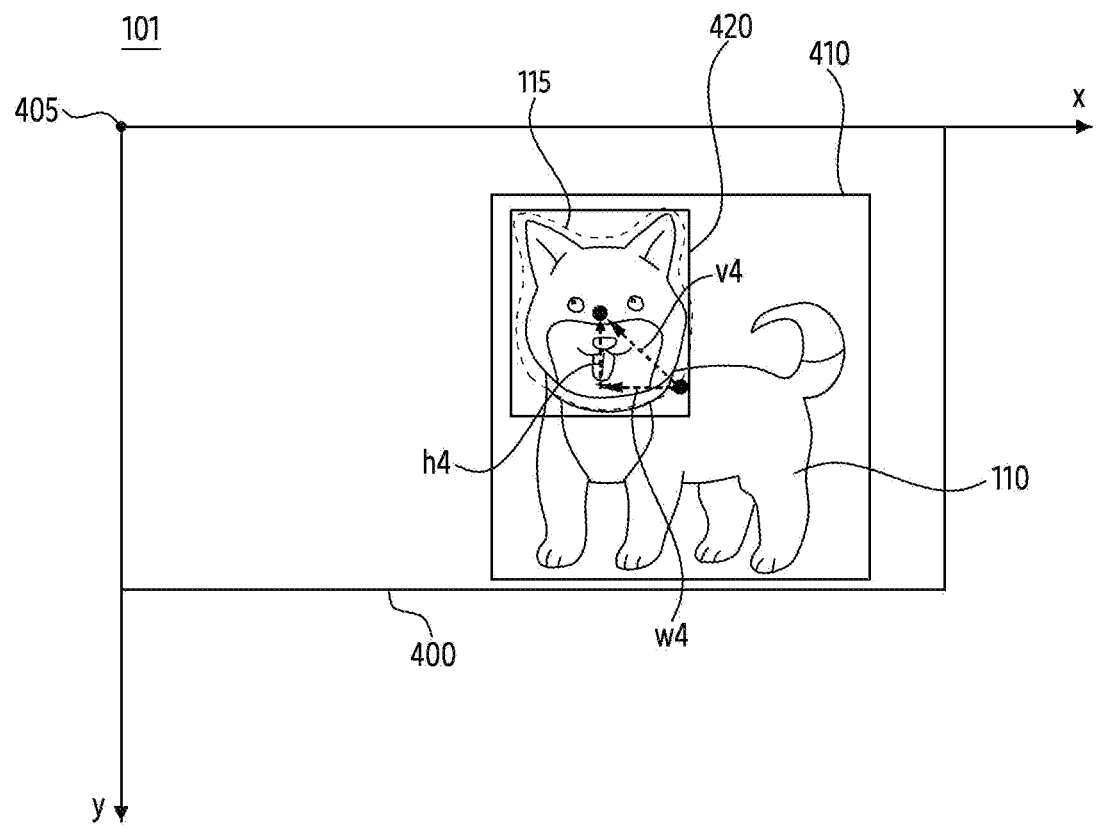
FIG. 4A illustrates an example of an electronic device identifying a preset portion of a subject, according to an embodiment.
Figure 4B:
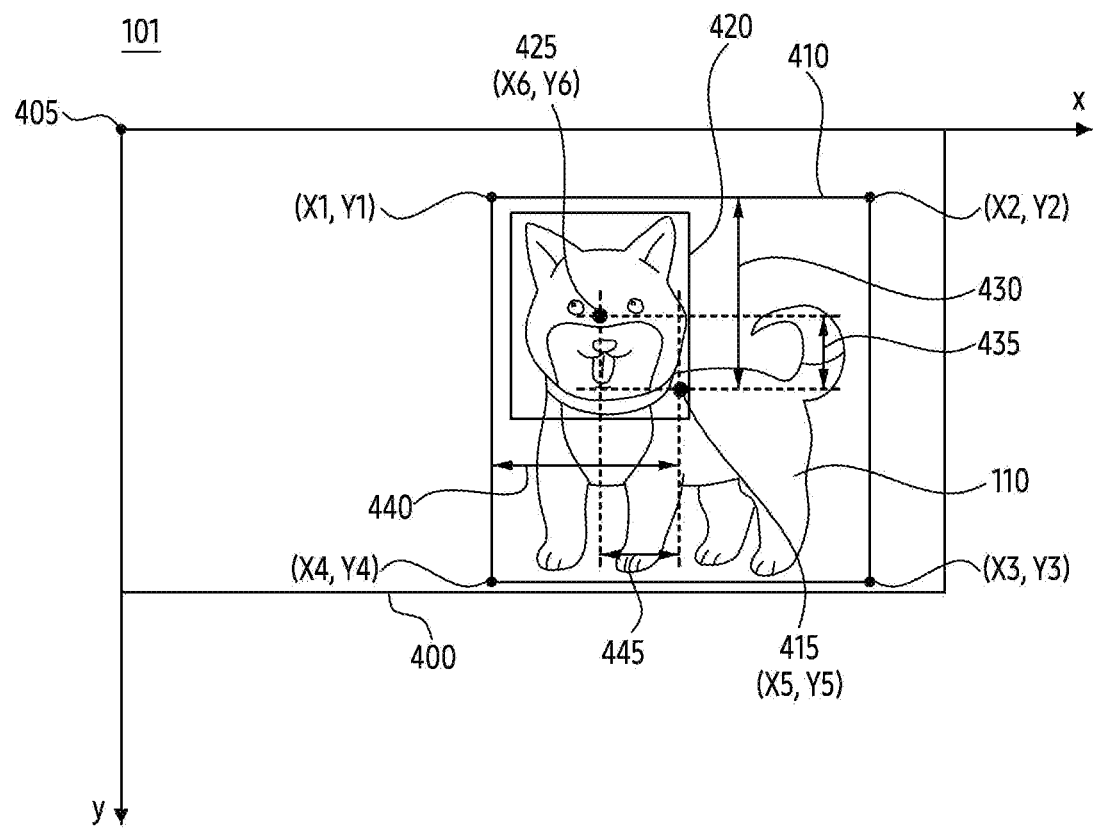
FIG. 4B illustrates an example of an electronic device identifying a preset portion of a subject, according to an embodiment.

FIG. 4A illustrates an example of an electronic device identifying a preset portion of a subject, according to an embodiment. FIG. 4B illustrates an example of an electronic device identifying a preset portion of a subject, according to an embodiment. An electronic device 101 of FIGS. 4A and/or 4B may include the electronic device 101 of FIGS. 1, 2, 3A, and/or 3B. Operations of FIGS. 4A and/or 4B may be executed by a processor 210 of FIG. 2. The operations of FIGS. 4A to 4B may be operations of the electronic device 101 performed in a state that is switched to an auto framing mode.

Referring to FIGS. 4A and/or 4B, according to an embodiment, the electronic device 101 may obtain image frames through a camera (e.g., a camera 220 of FIG. 2). The electronic device 101 may identify a subject 110 included in the image frames based on obtaining the image frames by using the camera. The electronic device 101 may identify a first area 410 matched to the subject 110. The electronic device 101 may identify a second area 420 including a preset portion 115 of the subject 110. For example, the preset portion 115 of the subject 110 may include a head of the subject 110 when the subject 110 is an animal or a human. The electronic device 101 may predict moving direction and moving velocity of the subject 110 based on identifying the first area 410 and the second area 420. For example, the electronic device 101 may identify a center 415 of the first area 410. The electronic device 101 may identify a center 425 of the second area 420. For example, the electronic device 101 may identify one point forming an edge of the image frame 400 based on identifying the subject 110 in the image frame 400. The electronic device 101 may determine the one point as an origin 405 of coordinate system. The coordinate system formed based on the origin 405 may include an x axis and a y axis. For example, the electronic device 101 may identify a coordinate value of the first area 410 including the subject 110 identified in the image frame 400. For example, the first area 410 may be formed based on first coordinate values X1 and Y1, second coordinate values X2 and Y2, third coordinate values X3 and Y3, and fourth coordinate values X4 and Y4. The electronic device 101 may identify coordinate values X5 and Y5 of the center 415 of the first area 410. The electronic device 101 may identify coordinate values X6 and Y6 of the center 425 of the second area 420. The electronic device 101 may predict the moving direction and the moving velocity of the subject 110, based on the coordinate values X5 and Y5 of the center 415 of the first area 410 and the coordinate values X6 and Y6 of the center 425 of the second area 420. For example, an equation for predicting the moving direction and the moving velocity of the subject 110 may be the same as Equation 3 below.

$$\overline{EstMove} = k1 \times \overline{EstMove\_W} + k2 \times \overline{EstMove\_H}$$ [Equation 3]

Referring to the Equation 3, for example, $\overline{EstMove}$ may correspond to a first vector v4 of FIG. 4A. For example, $\overline{EstMove\_W}$ may correspond to a second vector w4 of FIG. 4A. For $\overline{EstMove\_H}$ may correspond to a third vector h4 of FIG. 4A. The second vector w4 example, may be obtained by using the origin 405, the x coordinate value X5 of the center 415 of the first area 410, and the x coordinate value X6 of the center 425 of the second area 420. For example, the third vector h4 may be obtained by using the origin 405, the y coordinate value Y5 of the center 415 of the first area 410, and the y coordinate value Y6 of the center 425 of the second area 420. For example, k1, and k2 may be any value greater than or equal to 0 and less than or equal to 1. By using the k1 and the k2, the electronic device 101 may offset the influence associated with one of the x axis and/or the y axis. For example, the electronic device may adjust an absolute value of the vector formed in the x axis and/or the y axis direction to 0, based on presetting the values of the k1 and/or the k2 as 0. The electronic device may offset the influence associated with one of the x axis and/or the y axis by adjusting an absolute value of the vector to 0. The electronic device 101 may predict the moving direction and the moving velocity of the subject 110 based on the Equation 3.

According to an embodiment, the electronic device 101 may predict the movement of the subject 110 and may correct the area for cropping, based on Table 1 and Equations 4 to 7 to be described later. For example, in case that the condition shown in the Table 1 is satisfied, the electronic device 101 may identify that the direction in which the head of the subject 110 faces and the moving direction coincide. Based on that the direction in which the head of the subject 110 faces and the moving direction coincide, the electronic device 101 may predict the moving direction of the subject 110 by using the Equations 4 to 5. In case that it is different from the case of satisfying the conditions shown in the Table 1, the electronic device 101 may identify that the direction in which the head of the subject 110 faces and the moving direction are different. Based on that the direction in which the head of the subject 110 faces and the moving direction are different, the electronic device 101 may predict the moving direction of the subject 110 by using the Equations 6 to 7.

$$\text{PetPosition\_}W(N\,fr) = \text{PetPosition\_}W(N-1\,fr) + \text{Move\_}W(N-1\,fr)*(k1 + \text{weight\_}W*k2) \quad [\text{Equation 4}]$$

$$\text{PetPosition\_}H(N\,fr) = \text{PetPosition\_}H(N-1\,fr) + \text{Move\_}H(N-1\,fr)*(k1 + \text{weight\_}H*k2) \quad [\text{Equation 5}]$$

$$\text{PetPosition\_}W(N\,fr) = \text{PetPosition\_}W(N-1\,fr) + \text{Move\_}W(N-1\,fr)*k1 \quad [\text{Equation 6}]$$

$$\text{PetPosition\_}H(N\,fr) = \text{PetPosition\_}H(N-1\,fr) + \text{Move\_}H(N-1\,fr)*k1 \quad [\text{Equation 7}]$$

$$\text{PetPosition\_}W'(N\,fr) = \text{PetPosition\_}W(N\,fr) + \text{Move\_}W(N\,fr)*\text{weight\_}W*k1 \quad [\text{Equation 8}]$$

$$\text{PetPosition\_}H'(N\,fr) = \text{PetPosition\_}H(N\,fr) + \text{Move\_}H(N\,fr)*\text{weight\_}H*k1 \quad [\text{Equation 9}]$$

TABLE 1

| First condition | $\text{InnerProd}(\overrightarrow{\text{EstMove}}, \overrightarrow{\text{Move}}) > 0$ |
|---|---|
| Second condition | $|\overrightarrow{\text{VMove}}| > \text{th}$ |
| Third condition | $\text{InnerProd}(\overrightarrow{\text{EstMove}}, \overrightarrow{\text{VMove}}) > 0$ |

Referring to the Equations 4 to 7, the electronic device 101 may predict the movement of the subject 110 and may correct the area for cropping, by using the condition. For example, referring to the Table 1, $\text{InnerProd}(\overrightarrow{\text{EstMove}}, \overrightarrow{\text{Move}}) > 0$, which is the first condition, may mean that the inner product of $\overrightarrow{\text{EstMove}}$ of the Equation 3 and the vector v1 of FIG. 3A exceeds 0. For example, the $\text{InnerProd}(\overrightarrow{\text{EstMove}}, \overrightarrow{\text{Move}}) > 0$ may mean that the moving direction of the subject 110 and the predicted moving direction are the same. For example, $|\overrightarrow{\text{VMove}}| > \text{th}$ which is the first condition, may mean an absolute value of a secondary differential vector exceeding the threshold th. The absolute value of the secondary differential vector exceeding the threshold th may mean the subject 110 that is accelerating or decelerating exceeding the threshold th. For example, in case that the subject 110 moves left and right, the threshold th may be a value corresponding to about 5% of the horizontal length of the image frame. For example, in case that the subject 110 moves up and down, the threshold th may be a value corresponding to about 5% of the vertical length of the image frame. The threshold th is not limited to the above description. For example, $\text{InnerProd}(\overrightarrow{\text{EstMove}}, \overrightarrow{\text{VMove}}) > 0$ which is the third condition, may mean that the predicted moving direction and the secondary differential vector are in the same direction. The case that the second condition and the third condition are satisfied may mean that accelerating in a direction in which the subject 110 is looking. The electronic device 101 may predict a position of the subject 110, based on satisfying the first condition, the second condition, and the third condition. The case that the first condition, the second condition, and the third condition are satisfied may include a case of accelerating in the direction in which the head of the subject 110 faces.

For example, the electronic device 101 may predict and correct the movement of the subject 110 in the x axis direction by using the Equation 5. For example, PetPosition_W(N−1 fr)+Move_W(N−1 fr)*k1 obtained by deploying the Equation 4 may be a value obtained by predicting the position of the subject 110 in the N-th image frame based on the position of the subject 110 in the N−1-th image frame. For example, Move_W(N−1 fr)*weight_W*k2 obtained by deploying the Equation 4 may be a value for correcting the position of the subject 110 in the N-th image frame based on the movement of the subject 110 in the N−1-th image frame. For example, weight_W may mean a weight. Referring to FIG. 4B, the weight_W may be obtained based on a first horizontal length 440 and a second horizontal length 445. For example, the weight_W may be 'the second horizontal length 445/the first horizontal length 440'. For example, the k1, and/or k2 may be any value greater than or equal to 0 and less than or equal to 1.

For example, the electronic device 101 may predict and correct the movement of the subject 110 in the y axis direction by using the Equation 5. For example, PetPosition_H(N−1 fr)+Move_H(N−1 fr)*k1 obtained by deploying the Equation 5 may be the value obtained by predicting the position of the subject 110 in the N-th image frame based on the position of the subject 110 in the N−1-th image frame. For example, Move_H(N−1 fr)*weight_H*k2 obtained by deploying the Equation 5 may be the value for correcting the position of the subject 110 in the N-th image frame based on the movement of the subject 110 in the N−1-th image frame. For example, the weight_H may mean the weight. Referring to FIG. 4B, the weight_H may be obtained based on a first vertical length 430 and a second vertical length 435. For example, the weight_H may be 'the second vertical length 435/the first vertical length 430. For example, the k1, and/or k2 may be any value greater than or equal to 0 and less than or equal to 1. The operation of correcting the above-described position may mean presetting the area for cropping. For example, the electronic device 101 may identify the coordinate values X5 and Y5 of the center 415 of the first area 410. For example, the electronic device 101 may identify the coordinate values X6 and Y6 of the center 415 of the second area 420. The electronic device 101 may identify the vector v4 from the center 415 of the first area 410 to the center 425 of the second area 420, based on the coordinate values X5 and Y5 and the coordinate values X6 and Y6. The electronic device 101 may identify the moving direction of the subject 110, based on the vector v4.

According to an embodiment, the electronic device 101 may identify a case that it is different from the case of satisfying the conditions of the Table 1. In case that at least one of the conditions is not satisfied, the electronic device 101 may track the subject 110, by using the Equations 6 and 7. For example, PetPosition_W(N−1 fr)+Move_W(N−1 fr)*k1 may be a value obtained by predicting the position of the subject 110 in the N-th image frame, based on the position of the subject 110 in the N−1-th image frame. For example, the electronic device 101 may identify the position in the x axis direction based on the Equation 7. PetPosition_H(N−1 fr)+Move_H(N−1 fr)*k1 of the Equation 7 may be a value obtained by predicting the position of the subject 110 in the y axis direction in the N-th image frame, based on the position of the subject 110 in the N−1-th image frame.

For example, the Equation 8 may correspond to the Equation 4. For example, the Equation 9 may correspond to the Equation 5. For example, the Equations 8 to 9 may be Equations for performing correction, based on the N-th image frame. For example, based on the Equations 8 to 9, the electronic device 101 may perform correction with respect to image frames to be obtained by using the current position (e.g., the N-th image frame). For example, the correction may be associated with an operation of performing cropping.

According to an embodiment, the electronic device 101 may predict the moving direction and the moving velocity of the subject 110 by using the Equation 6. The electronic device 101 may obtain a video based on predicting the moving direction and the moving velocity of the subject 110. For example, the electronic device 101 may perform cropping with respect to an area including the subject 110 based on obtaining the moving direction and the moving velocity of the subject 110. The electronic device 101 may obtain a video (i.e., moving image) as the preview image based on performing the cropping.

According to an embodiment, the electronic device 101 may adjust the resolution of the obtained video based on performing the cropping. For example, the electronic device 101 may adjust the resolution of the cropped area, in order to match the resolution of the display (e.g., a display 230 of FIG. 2) of the electronic device 101. According to an embodiment, the electronic device 101 may perform image enhancement with respect to the cropped area. The image enhancement may include contrast enhancement, linear contrast stretch, histogram-equalized stretch, and/or spatial filtering.

As described above, according to an embodiment, the electronic device 101 may identify the subject 110 in the image frame 400. The electronic device 101 may identify the first area 410 matched to the subject 110 in the image frame 400 and the second area 420 including the preset portion 115 of the subject 110. For example, the preset portion 115 may include a head of the subject 110 when the subject 110 is an animal or a human. The electronic device 101 may identify the center of each of the first area 410 and the second area 420. The electronic device 101 may identify the coordinate values X5 and Y5 of the center 415 of the first area 410. The electronic device 101 may identify the coordinate values X6 and Y6 of the center 425 of the second area 420. The electronic device 101 may identify the vector v4 extended from the center 415 of the first area 410 to the center 425 of the second area 420, based on the coordinate values X5 and Y5 and the coordinate values X6 and Y6. The electronic device 101 may predict the moving direction and the moving velocity of the subject 110 based on the vector v4. The electronic device 101 may perform cropping with respect to the image frame 400 based on predicting the moving direction and the moving velocity of the subject 110. The electronic device 101 may obtain a video including a cropped image frame based on performing the cropping with respect to the image frame 400. The electronic device 101 may easily track the subject 110, by obtaining a video as the preview image, based performing the cropping by predicting the movement of the subject 110.

Figure 5:
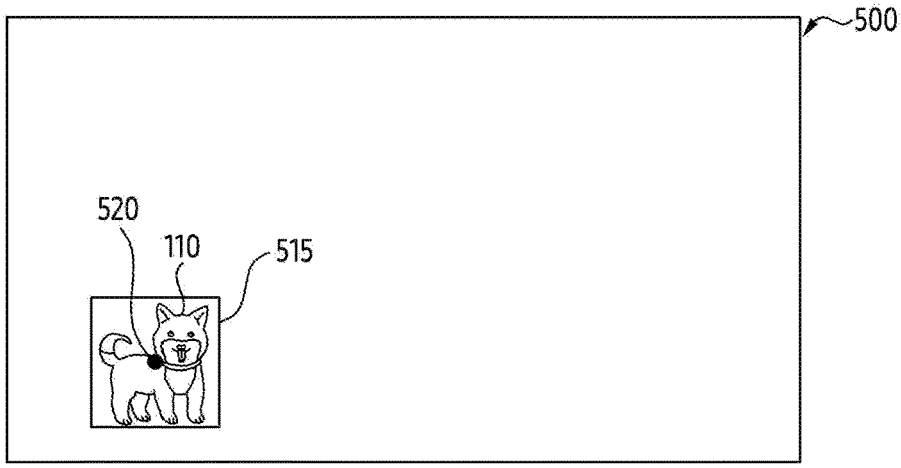
FIG. 5 illustrates an example of an electronic device for identifying movement of a subject through a camera, according to an embodiment.
Figure 5:
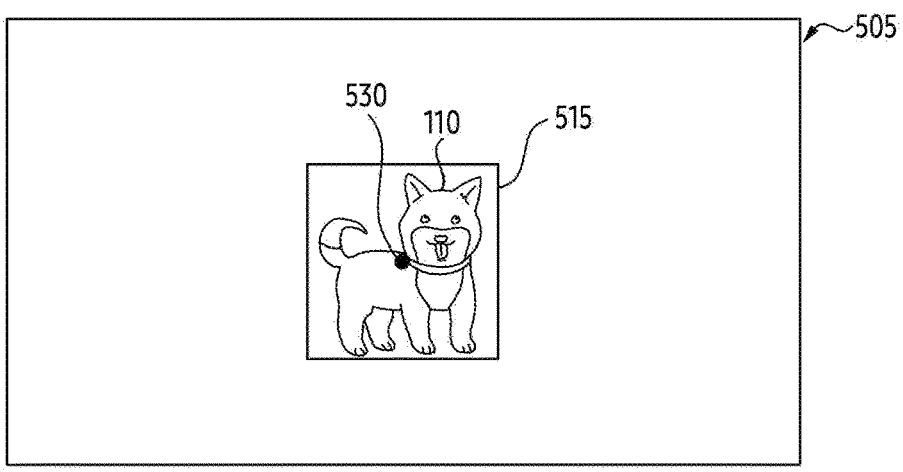
Figure 5:
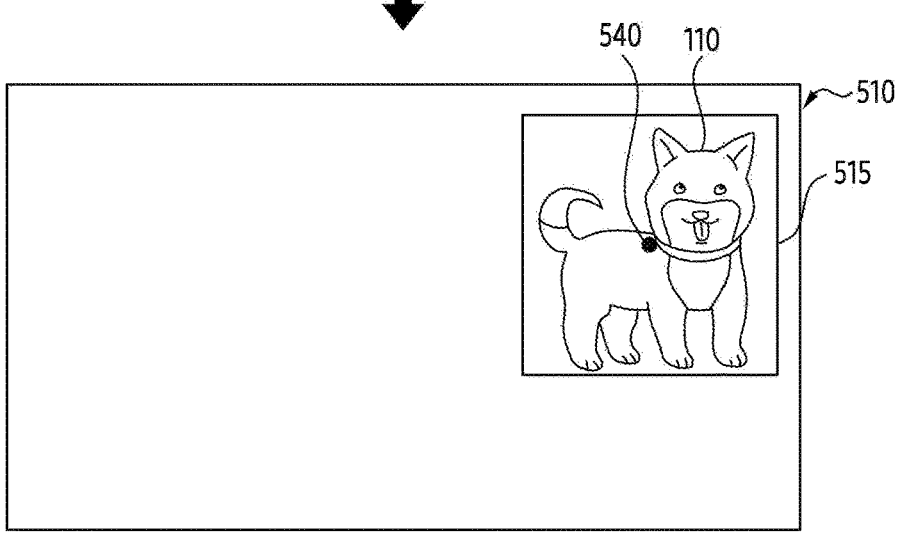

FIG. 5 illustrates an example of an electronic device for identifying movement of a subject through a camera, according to an embodiment. An electronic device 101 of FIG. 5 may include the electronic device 101 of FIGS. 1, 2, 3A, 3B, 4A, and/or 4B. The operations of FIG. 5 may be executed by a processor 210 of FIG. 2. The operations of FIG. 5 may be operations of the electronic device 101 performed in a state that is switched to an auto framing mode.

Referring to FIG. 5, according to an embodiment, the electronic device 101 may obtain image frames 500, 505, and 510 through a camera (e.g., a camera 220 of FIG. 2). The electronic device 101 may identify a subject 110 in the image frames 500, 505, and 510. The electronic device 101 may identify an area 515 matched to the subject 110 based on identifying the subject 110. The electronic device 101 may identify movement of the subject 110 and/or the area 515 based on identifying the area 515. The electronic device 101 may identify a size of the subject 110 in the image frames 500, 505, and 510. The size of the subject 110 may be identified based on the area 515. For example, the electronic device 101 may identify the size of the subject 110 based on the area 515. For example, the electronic device 101 may identify the size of the subject 110 based on the area 515. The electronic device 101 may identify a distance between the electronic device 101 and the subject 110 based on the size of the subject 110 and/or the area 515. The electronic device 101 may identify a first size of the subject 110 and/or a second size of the area 515 in the image frame 500. The electronic device 101 may identify a third size of the subject 110 and/or a fourth size of the area 515 in the image frame 505. The electronic device 101 may identify a fifth size of the subject 110 and/or a sixth size of the area 515 in the image frame 510. For example, the electronic device 101 may compare the sizes of the first size, the third size, and/or the fifth size. The electronic device 101 may identify that the fifth size is relatively larger than the first size. In an embodiment, the electronic device 101 may perform zoom-out in the image frame 510 based on identifying that the fifth size is relatively larger than the first size. For example, the electronic device 101 may compare sizes of the second size, the fourth size, and/or the sixth size. The electronic device 101 may identify that the sixth size is relatively larger than the second size. In an embodiment, the electronic device 101 may perform zoom-out in the image frame 510 based on identifying that the sixth size is relatively larger than the second size. An example of FIG. 5 may be an example in which the subject 110 approaches the electronic device 101. In an example in which the subject 110 approaches the electronic device 101, the electronic device 101 may perform zoom-out with respect to the subject 110. In an example different from the example of FIG. 5, the electronic device 101 may identify that the subject 110 is moving away from the electronic device 101. For example, while the subject 110 is moving away, the electronic device 101 may identify that the size of the subject 110 and/or the area 515 matched to the subject 110 is reduced. Based on that the size of the subject 110 and/or the area 515 matched to the subject 110 is reduced, the electronic device 101 may perform zoom-in with respect to the subject 110. Based on performing the zoom-in, the electronic device 101 may obtain a video in which the subject 110 is enlarged.

According to an embodiment, the electronic device 101 may identify the area 515 matched to the subject 110, based on the subject 110 identified in the image frames 500, 505, and 510. The electronic device 101 may identify a center of the area 515. For example, the electronic device 101 may identify a center 520 of the area 515 in the image frame 500. The electronic device 101 may identify a center 530 of the area 515 in the image frame 505. The electronic device 101 may identify a center 540 of the area 515 in the image frame 510. The electronic device 101 may identify the movement of the subject 110 based on identifying the centers 520, 530, and 540. For example, moving from the center 520 to the center 540 may mean the movement of the subject 110. The electronic device 101 may perform interpolation of the image frames 500, 505, and 510 based on movement of the area matched to the subject 110. For example, the interpolation may include linear interpolation, parabolic interpolation, Lagrange interpolation, Newton interpolation, and/or spline interpolation. The electronic device 101 may obtain the video based on performing the interpolation. As described above, according to an embodiment, the electronic device 101 may perform the interpolation based on the subject 110 identified in the image frames. The electronic device 101 may obtain the video based on performing the interpolation. The electronic device 101 may obtain the video in which the movement of the subject 110 is smooth by obtaining the video on which the interpolation is performed.

According to an embodiment, the electronic device 101 may predict the moving direction of the subject 110 based on the image frames 500, 505, and 510 obtained through the camera. For example, the electronic device 101 may predict the moving direction of the subject 110 based on the centers 520, 530, and 540 of the areas 515. For example, the operation of predicting the movement of the subject 110 may be referred to as an operation of predicting the moving direction and/or the moving velocity of the subject 110 described above in FIGS. 3A, 3B, 4A, and/or 4B. The electronic device 101 may predict the movement of the subject 110, based on an area matched to the head of the subject 110 and the area 515 matched to the subject 110, based on a direction in which the head of the subject 110 faces. In an example of FIG. 5, the electronic device 101 may predict the movement of the subject 110 by using Equation 4 and/or Equation 5 described above in FIGS. 4A to 4B. The electronic device 101 may cropping the subject 110 based on predicting the movement of the subject 110. The electronic device 101 may perform the interpolation when cropping the subject 110. The electronic device 101 may display the cropped subject 110 as a preview image based on performing the interpolation. The electronic device 101 may obtain a video corresponding to the area 515 representing the cropped subject 110. As described above, according to an embodiment, the electronic device 101 may display a smoother preview image by performing the interpolation based on predicting the movement of the subject 110.

As described above, according to an embodiment, the electronic device 101 may perform zoom-in and/or zoom-out with respect to the subject 110 based on the movement of the subject 110. The electronic device 101 may perform the interpolation based on the movement of the subject 110. The electronic device 101 may obtain the video based on performing the zoom-in, the zoom-out, and/or the interpolation. The electronic device 101 may obtain the video in which the movement of the subject 110 is smooth by performing the zoom-in, the zoom-out, and/or the interpolation.

Figure 6:
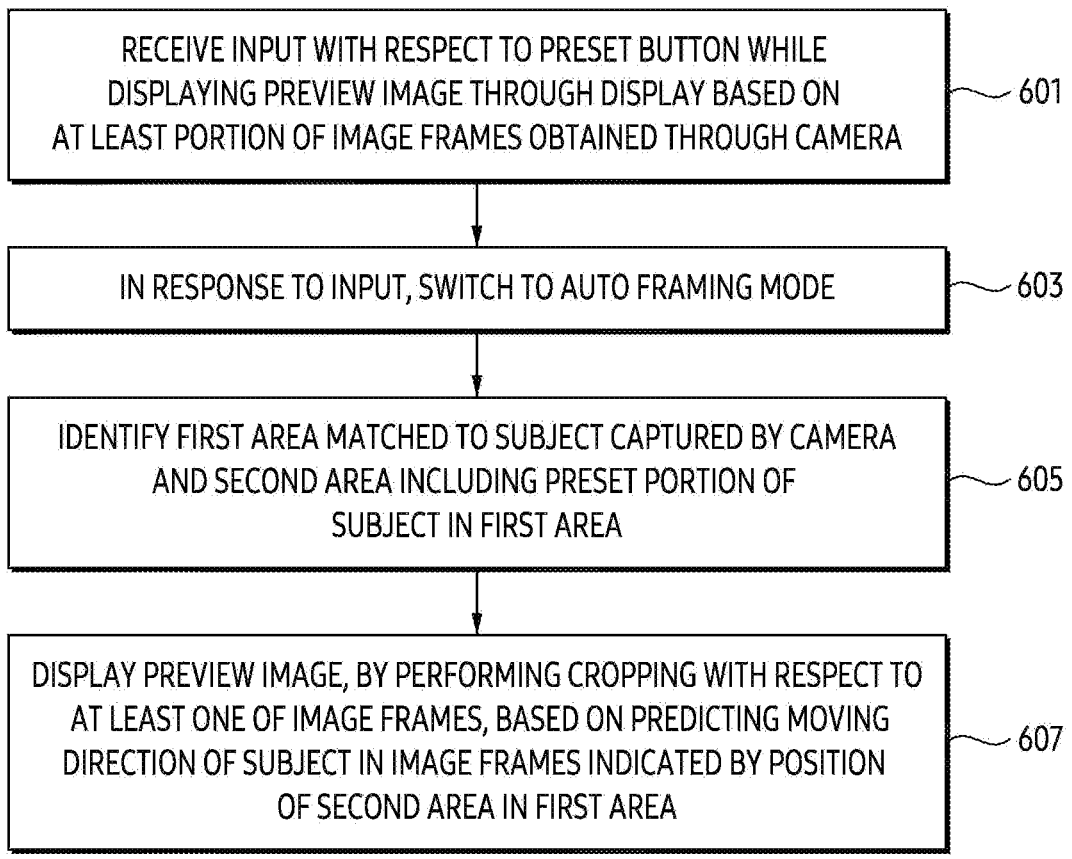
FIG. 6 illustrates an example of a flowchart of an operation of an electronic device, according to an embodiment.

FIG. 6 illustrates an example of a flowchart of an operation of an electronic device, according to an embodiment. The electronic device of FIG. 6 may include an electronic device 101 of FIGS. 1, 2, 3A, 3B, 4A, 4B, and/or 5. Operations of FIG. 6 may be executed by a processor 210 of FIG. 2. The operations of FIG. 6 may be operations of the electronic device 101 performed in a state that is switched to an auto framing mode.

Referring to FIG. 6, in operation 601, according to an embodiment, the electronic device may display a preview image through a display (e.g., a display 230 of FIG. 2), based on at least a portion (e.g., an image frame 300 of FIG. 3A, an image frame 305 of FIG. 3A, an image frame 350 of FIG. 3B, an image frame 355 of FIG. 3B, an image frame 400 of FIG. 4A, an image frame 400 of FIG. 4B, and/or image frames 500, 505, 510 of FIG. 5) of image frames obtained through a camera (e.g., a camera 220 of FIG. 2). The electronic device may receive an input with respect to a preset button while displaying the preview image through the display.

In operation 603, according to an embodiment, the electronic device may operate in the auto framing mode in response to the input with respect to the preset button. For example, the auto framing mode may be an operation of performing cropping with respect to at least one subject in the image frames obtained through the camera. For example, the auto framing mode may be an operation of tracking an identified subject in the image frames.

In operation 605, according to an embodiment, the electronic device may identify the subject (e.g., a subject 110 of FIGS. 1, 3A, 3B, 4A, 4B, and 5) captured by the camera in response to the input with respect to the preset button. According to an embodiment, the electronic device may assign an identifier corresponding to the subject based on identifying the subject. The electronic device may identify a first area (e.g., a first area 120 of FIG. 1, a first area 310 of FIG. 3A or 3B, a first area 410 of FIG. 4A or 4B) matched to the subject based on assigning the identifier to the subject. The electronic device may identify the first area matched to the subject captured by the camera and a second area (e.g., a second area 130 of FIG. 1, a second area 420 of FIGS. 4A, and/or 4B) including a preset portion (e.g., a preset portion 115 of FIGS. 1, 4A, and/or 4B) of the subject in the first area. For example, the subject may be a subject classified to animal. For example, the electronic device may identify the subject classified to the animal. For example, the preset portion of the subject may include a head of the subject. The electronic device may identify the second area in which the head of the animal is captured. The electronic device may identify the second area in which the head of the animal is captured, based on identifying the subject classified to the animal.

In operation 607, according to an embodiment, the electronic device may predict a moving direction of the subject in the image frames, indicated by a position of the second area in the first area. Based on the prediction, the electronic device may obtain a video corresponding to a photographing input, by performing the cropping with respect to at least one of the image frames. For example, the electronic device may identify a vector (e.g., a vector v0 in FIG. 1) indicated by the position of the second area in the first area. For example, the electronic device may determine one point forming an edge of the image frames as an origin (e.g., an origin 405 of FIG. 4A) of a coordinate system. The electronic device may identify a first coordinate value (e.g., a first coordinate value 315 of FIG. 3B), which is a center of the first area, based on the one point (or the origin). The electronic device may identify the first coordinate value that is the center of the first area in a coordinate system formed with the one point as the origin. The electronic device may identify a second coordinate value (e.g., a second coordinate value 325 of FIG. 3B) that is the center of the second area based on the one point (or the origin). The electronic device may identify the second coordinate value that is the center of the second area in the coordinate system formed with the one point as the origin. The electronic device may identify the first coordinate value and the second coordinate value.

According to an embodiment, the electronic device may identify the first coordinate value that is the center of the first area and the second coordinate value that is the center of the second area. The electronic device may identify a vector extended from the center of the first area to the center of the second area based on the first coordinate value and the second coordinate value. For example, the electronic device may identify the vector by using the origin of the coordinate system, the first coordinate value, and the second coordinate value. According to an embodiment, the electronic device may obtain a weight to be applied to the vector based on the first coordinate value and the second coordinate value. For example, the vector may be associated with the moving direction of the subject. The electronic device may perform cropping with respect to at least one of image frames obtained through the camera, based on the moving direction. The electronic device may display the preview image based on performing the cropping.

As described above, according to an embodiment, the electronic device may display the preview image through the display based on at least a portion of image frames obtained through the camera. The electronic device may receive the photographing input while displaying the preview image. The electronic device may identify the subject captured by the camera in response to the photographing input. The electronic device may identify the first area matched to the subject. The electronic device may identify the second area including the preset portion of the subject in the first area. The electronic device may identify the moving direction of the subject in the image frames, which is indicated by the position of the second area in the first area. For example, the electronic device may predict the moving direction of the subject in the image frames. The electronic device may obtain a video corresponding to the photographing input by performing the cropping with respect to at least one of the image frames based on predicting the moving direction of the subject. The electronic device may obtain a video in which the movement of the subject is smooth, by performing the cropping with respect to the at least one of the image frames based on the moving direction of the subject and obtaining the video corresponding to the photographing input. For example, the electronic device may position the subject in the center of the screen, by predicting the moving direction of the subject and performing the cropping.

Figure 7:
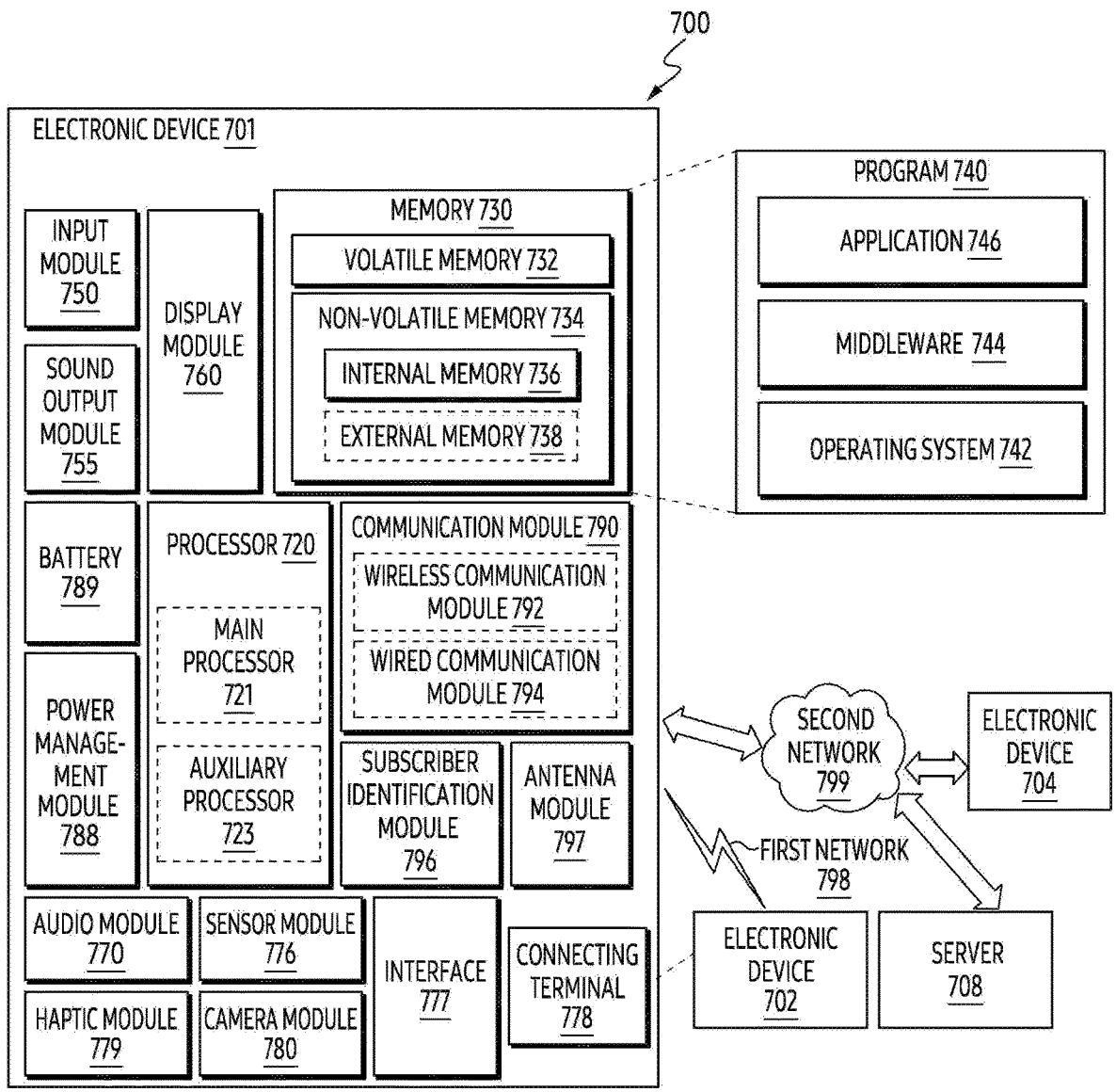
FIG. 7 illustrates an example of a block diagram in a network environment of an electronic device, according to an embodiment.

FIG. 7 is a block diagram illustrating an electronic device 701 in a network environment 700 according to various embodiments.

Referring to FIG. 7, the electronic device 701 in the network environment 700 may communicate with an electronic device 702 via a first network 798 (e.g., a short-range wireless communication network), or at least one of an electronic device 704 or a server 708 via a second network 799 (e.g., a long-range wireless communication network). According to an embodiment, the electronic device 701 may communicate with the electronic device 704 via the server 708. According to an embodiment, the electronic device 701 may include a processor 720, memory 730, an input module 750, a sound output module 755, a display module 760, an audio module 770, a sensor module 776, an interface 777, a connecting terminal 778, a haptic module 779, a camera module 780, a power management module 788, a battery 789, a communication module 790, a subscriber identification module (SIM) 796, or an antenna module 797. In some embodiments, at least one of the components (e.g., the connecting terminal 778) may be omitted from the electronic device 701, or one or more other components may be added in the electronic device 701. In some embodiments, some of the components (e.g., the sensor module 776, the camera module 780, or the antenna module 797) may be implemented as a single component (e.g., the display module 760).

The processor 720 may execute, for example, software (e.g., a program 740) to control at least one other component (e.g., a hardware or software component) of the electronic device 701 coupled with the processor 720, and may perform various data processing or computation. According to one embodiment, as at least part of the data processing or computation, the processor 720 may store a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a central processing unit (CPU) or an application processor (AP)), or an auxiliary processor 723 (e.g., a graphics processing unit (GPU), a neural processing unit (NPU), an image signal processor (ISP), a sensor hub processor, or a communication processor (CP)) that is operable independently from, or in conjunction with, the main processor 721. For example, when the electronic device 701 includes the main processor 721 and the auxiliary processor 723, the auxiliary processor 723 may be adapted to consume less power than the main processor 721, or to be specific to a specified function. The auxiliary processor 723 may be implemented as separate from, or as part of the main processor 721.

The auxiliary processor 723 may control at least some of functions or states related to at least one component (e.g., the display module 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an image signal processor or a communication processor) may be implemented as part of another component (e.g., the camera module 780 or the communication module 790) functionally related to the auxiliary processor 723. According to an embodiment, the auxiliary processor 723 (e.g., the neural processing unit) may include a hardware structure specified for artificial intelligence model processing. An artificial intelligence model may be generated by machine learning. Such learning may be performed, e.g., by the electronic device 701 where the artificial intelligence is performed or via a separate server (e.g., the server 708). Learning algorithms may include, but are not limited to, e.g., supervised learning, unsupervised learning, semisupervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input module 750 may receive a command or data to be used by another component (e.g., the processor 720) of the electronic device 701, from the outside (e.g., a user) of the electronic device 701. The input module 750 may include, for example, a microphone, a mouse, a key board, a key (e.g., a button), or a digital pen (e.g., a stylus pen).

The sound output module 755 may output sound signals to the outside of the electronic device 701. The sound output module 755 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 760 may visually provide information to the outside (e.g., a user) of the electronic device 701. The display module 760 may include, for example, a display, a hologram device, or a projector and control circuitry to control a corresponding one of the display, hologram device, and projector. According to an embodiment, the display module 760 may include a touch sensor adapted to detect a touch, or a pressure sensor adapted to measure the intensity of force incurred by the touch.

The audio module 770 may convert a sound into an electrical signal and vice versa. According to an embodiment, the audio module 770 may obtain the sound via the input module 750, or output the sound via the sound output module 755 or a headphone of an external electronic device (e.g., an electronic device 702) directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device (e.g., the electronic device 702) directly (e.g., wiredly) or wirelessly. According to an embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device (e.g., the electronic device 702). According to an embodiment, the connecting terminal 778 may include, for example, a HDMI connector, a USB connector, a SD card connector, or an audio connector (e.g., a headphone connector).

The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, image signal processors, or flashes.

The power management module 788 may manage power supplied to the electronic device 701. According to one embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor (AP)) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or infrared data association (IrDA)) or the second network 799 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The wireless communication module 792 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 792 may support a high-frequency band (e.g., the mmWave band) to achieve, e.g., a high data transmission rate. The wireless communication module 792 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 792 may support various requirements specified in the electronic device 701, an external electronic device (e.g., the electronic device 704), or a network system (e.g., the second network 799). According to an embodiment, the wireless communication module 792 may support a peak data rate (e.g., 20 Gbps or more) for implementing eMBB, loss coverage (e.g., 764 dB or less) for implementing mMTC, or U-plane latency (e.g., 0.5 ms or less for each of downlink (DL) and uplink (UL), or a round trip of 7 ms or less) for implementing URLLC.

The antenna module 797 may transmit or receive a signal or power to or from the outside (e.g., the external electronic device) of the electronic device 701. According to an embodiment, the antenna module 797 may include an antenna including a radiating element composed of a conductive material or a conductive pattern formed in or on a substrate (e.g., a printed circuit board (PCB)). According to an embodiment, the antenna module 797 may include a plurality of antennas (e.g., array antennas). In such a case, at least one antenna appropriate for a communication scheme used in the communication network, such as the first network 798 or the second network 799, may be selected, for example, by the communication module 790 (e.g., the wireless communication module 792) from the plurality of antennas. The signal or the power may then be transmitted or received between the communication module 790 and the external electronic device via the selected at least one antenna. According to an embodiment, another component (e.g., a radio frequency integrated circuit (RFIC)) other than the radiating element may be additionally formed as part of the antenna module 797.

According to various embodiments, the antenna module 797 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 or 704 may be a device of a same type as, or a different type, from the electronic device 701. According to an embodiment, all or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, mobile edge computing (MEC), or client-server computing technology may be used, for example. The electronic device 701 may provide ultra low-latency services using, e.g., distributed computing or mobile edge computing. In another embodiment, the external electronic device 704 may include an internet-of-things (IOT) device. The server 708 may be an intelligent server using machine learning and/or a neural network. According to an embodiment, the external electronic device 704 or the server 708 may be included in the second network 799. The electronic device 701 may be applied to intelligent services (e.g., smart home, smart city, smart car, or healthcare) based on 5G communication technology or IoT-related technology.

According to an embodiment, the electronic device 701 may include the electronic device 101 of FIGS. 1, 2, 3A, 3B, 4A, 4B, and/or 5 and/or the electronic device of FIG. 6.

Based on capturing a moving subject, a method for obtaining a video by cropping an area corresponding to the subject may be required.

As described above, according to an embodiment, an electronic device 101; 701 may comprise a display 230, a camera 220, and a processor 210. The processor 210 may receive, while displaying a preview image through the display 230 based on at least portion of image frames obtained through the camera 220, an input with respect to a preset button. The processor 210 may switch to an auto framing mode in response to the input. The processor 210 may identify a first area 120; 310; 410 matched to a subject 110 captured by the camera 220, and a second area 130; 420 including a preset portion 115 of the subject 110 in the first area 120; 310; 410. The processor 210, based on predicting a moving direction of the subject 110 in the image frames by a position of the second area 130; 420 in the first area 120; 310; 410, may display the preview image by performing cropping with respect to at least one of the image frames.

According to an embodiment, the processor 210 may determine one point forming an edge of the image frames as an origin of coordinate system. The processor 210 may identify, based on the determined point, a first coordinate value which is a center 125; 315; 415 of the first area 120; 310; 410 and a second coordinate value which is a center of the second area 130; 420. The processor 210 may identify, based on the first coordinate value and the second coordinate value, a vector extended from the center of the first area 120; 310:410 to the center of the second area 130; 420.

According to an embodiment, the processor 210 may obtain, based on the first coordinate value and the second coordinate value, a weight to be applied to the vector.

According to an embodiment, the processor 210 may assign, based on identifying the subject 110 that is the first subject 110 and second subject that is different from the first subject 110 in the image frames, a first identifier and a second identifier to the first subject 110 and the second subject, respectively.

According to an embodiment, the processor 210 may perform, based on assigning the first and second identifiers to the first and second subjects identified in the image frames, cropping to include the first and second subjects.

According to an embodiment, the processor 210 may comprise a sensor. The processor 210 may identify, based on data obtained by using the sensor, motion of the electronic device 101; 701. The processor 210 may obtain, based on identifying the motion of the electronic device 101; 701, a video as the preview image.

According to an embodiment, the processor 210 may identify, in the image frames, a feature point of a second subject different from the subject 110 that is the first subject 110. The processor 210 may identify, based on identifying the feature point, a moving direction associated with the feature point of the second subject in the image frames. The processor 210 may track, based on identifying the moving direction associated with the feature point of the second subject, the first subject 110.

According to an embodiment, the processor 210, based on identifying the subject 110 classified to an animal, identify, in the first area 120; 310; 410, may the second area 130; 420 where a head of the animal is captured.

As described above, according to an embodiment, a method of an electronic device 101; 701 may comprise receiving, while displaying a preview image through the display 230 based on at least portion of image frames obtained through the camera 220, an input with respect to a preset button. The method of the electronic device 101; 701 may comprise switching to an auto framing mode in response to the input. The method of the electronic device 101; 701 may comprise identifying a first area 120; 310; 410 matched to a subject 110 captured by the camera 220, and a second area 130; 420 including a preset portion 115 of the subject 110 in the first area 120; 310; 410. The method of the electronic device 101; 701 may comprise, based on predicting a moving direction of the subject 110 in the image frames indicated by a position of the second area 130; 420 in the first area 120; 310; 410, displaying the preview image by performing cropping with respect to at least one of the image frames.

According to an embodiment, the method of the electronic device 101; 701 may comprise determining one point forming an edge of the image frames as an origin of coordinate system. The method of the electronic device 101; 701 may comprise identifying, based on the determined point, a first coordinate value which is a center of the first area 120; 310, 410 and a second coordinate value which is a center of the second area 130; 420. The method of the electronic device 101; 701 may comprise identifying, based on the first coordinate value and the second coordinate value, a vector extended from the center of the first area 120; 310; 410 to the center of the second area 130; 420.

According to an embodiment, the method of the electronic device 101; 701 may comprise obtaining, based on the first coordinate value and the second coordinate value, a weight to be applied to the vector.

According to an embodiment, the method of the electronic device 101; 701 may comprise assigning, based on identifying the subject 110 that is the first subject 110 and second subject that is different from the first subject 110 in the image frames, a first identifier and a second identifier to the first subject 110 and the second subject, respectively.

According to an embodiment, the method of the electronic device 101; 701 may comprise performing, based on assigning the first and second identifiers to the first and second subjects identified in the image frames, cropping to include the first and second subjects.

According to an embodiment, the method of the electronic device 101; 701 may comprise identifying, based on data obtained by using a sensor, motion of the electronic device 101; 701. The method of the electronic device 101; 701 may comprise obtaining a video as the preview image based on identifying the motion of the electronic device 101; 701.

According to an embodiment, the method of the electronic device 101; 701 may comprise: identifying, in the image frames, a feature point of a second subject different from the subject 110 that is the first subject 110. The method of the electronic device 101; 701 may comprise identifying, based on identifying the feature point, a moving direction associated with the feature point of the second subject in the image frames. The method of the electronic device 101; 701 may comprise tracking, based on identifying the moving direction associated with the feature point of the second subject, the first subject 110.

According to an embodiment, the method of the electronic device 101; 701 may comprise, based on identifying the subject 110 classified to an animal, identifying, in the first area 120; 310; 410, the second area 130; 420 where a head of the animal is captured.

As described above, according to an embodiment, a computer-readable storage medium storing one or more programs, where the one or more programs, when executed by a processor 210 of an electronic device 101; 701, may cause the processor 210 of the electronic device 101; 701 to receive, while displaying a preview image through the display 230 based on at least portion of image frames obtained through the camera 220, an input with respect to a preset button. The one or more programs, when executed by a processor 210 of an electronic device 101; 701, may cause the processor 210 of the electronic device 101; 701 to switch to an auto framing mode in response to the input. The one or more programs, when executed by a processor 210 of an electronic device 101; 701, may cause the processor 210 of the electronic device 101; 701 to identify a first area 120; 310; 410 matched to a subject 110 captured by the camera 220, and a second area 130; 420 including a preset portion 115 of the subject 110 in the first area 120; 310; 410. The one or more programs, when executed by a processor 210 of an electronic device 101; 701, may cause the processor 210 of the electronic device 101; 701, based on predicting a moving direction of the subject 110 in the image frame by a position of the second area 130; 420 in the first area 120; 310; 410, to display the preview image by performing cropping with respect to at least one of the image frames.

According to an embodiment, the one or more programs, when executed by the processor 210 of the electronic device 101; 701, may cause the processor 210 of the electronic device 101 to determine one point forming an edge of the image frames as an origin of coordinate system. The one or more programs, when executed by the processor 210 of the electronic device 101, may cause the processor 210 of the electronic device 101 to identify, based on the determined point, a first coordinate value which is a center of the first area 120; 310, 410 and a second coordinate value which is a center of the second area 130; 420. The one or more programs, when executed by the processor 210 of the electronic device 101, may cause the processor 210 of the electronic device 101; 701 to identify, based on the first coordinate value and the second coordinate value, a vector extended from the center of the first area 120; 310; 410 to the center of the second area 130; 420.

According to an embodiment, the one or more programs, when executed by the processor 210 of the electronic device 101; 701, may cause the processor 210 of the electronic device 101; 701 to obtain, based on the first coordinate value and the second coordinate value, a weight to be applied to the vector.

According to an embodiment, the one or more programs, when executed by the processor 210 of the electronic device 101; 701, may cause the processor 210 of the electronic device 101; 701 to assign, based on identifying the subject 110 that is the first subject 110 and second subject that is different from the first subject 110 in the image frames, a first identifier and a second identifier to the first subject 110 and the second subject, respectively.

According to an embodiment, the one or more programs, when executed by the processor 210 of the electronic device 101; 701, may cause the processor 210 of the electronic device 101; 701 to perform, based on assigning identifiers to each of subjects identified in the image frames, cropping to include the subjects.

According to an embodiment, the one or more programs, when executed by the processor 210 of the electronic device 101; 701, may cause the processor 210 of the electronic device 101 to identify, based on data obtained by using a sensor, motion of the electronic device 101; 701. The one or more programs, when executed by the processor 210 of the electronic device 101, may cause the processor 210 of the electronic device 101; 701 to obtain a video as the preview image based on identifying the motion of the electronic device 101; 701.

According to an embodiment, the one or more programs, when executed by the processor 210 of the electronic device 101; 701, may cause the processor 210 of the electronic device 101 to identify, in the image frames, a feature point of a second subject different from the subject 110 that is the first subject 110. The one or more programs, when executed by the processor 210 of the electronic device 101, may cause the processor 210 of the electronic device 101 to identify, based on identify the feature point, a moving direction associated with the feature point of the second subject in the image frames. The one or more programs, when executed by the processor 210 of the electronic device 101, may cause the processor 210 of the electronic device 101; 701 to track, based on identifying the moving direction associated with the feature point of the second subject, the first subject 110.

According to an embodiment, the one or more programs, when executed by the processor 210 of the electronic device 101; 701, may cause the processor 210 of the electronic device 101; 701 to identify, based on identifying the subject 110 classified to animal, in the first area 120; 310; 410, the second area 130; 420 where a head of the animal is captured.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Various embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor (e.g., the processor 720) of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:
1. An electronic device, comprising:
a display;
a camera; and
at least one processor; and
memory storing instructions that, when executed by the at least one processor, cause the electronic device to:

receive, while displaying a preview image through the display based on at least a portion of image frames obtained through the camera, an input with respect to a preset button;
switch to an auto framing mode in response to the input;
identify a first area matched to a subject captured by the camera, and a second area that includes a preset portion of the subject and is a portion of the first area;
identify a first coordinate value which is a center of the first area and a second coordinate value which is a center of the second area;
identify, based on the first coordinate value and the second coordinate value, a vector extended from the center of the first area to the center of the second area in a same image frame; and
based on predicting a moving direction of the subject in the image frames by the vector, display the preview image by performing cropping with respect to at least one of the image frames.

2. The electronic device of claim 1, wherein the instructions cause the electronic device to:
determine one point forming an edge of the image frames as an origin of coordinate system; and
identify, based on the determined point, the first coordinate value and the second coordinate value.

3. The electronic device of claim 2, wherein the instructions cause the electronic device to:
obtain, based on the first coordinate value and the second coordinate value, a weight to be applied to the vector.

4. The electronic device of claim 1, wherein the subject includes a first subject and a second subject different from the first subject,
wherein the instructions cause the electronic device to:
assign, based on identifying the first subject and the second subject in the image frames, a first identifier and a second identifier to the first subject and the second subject, respectively.

5. The electronic device of claim 4, wherein the instructions cause the electronic device to:
perform, based on assigning the first and second identifiers to the first and second subjects identified in the image frames, respectively, cropping to include the first and second subjects.

6. The electronic device of claim 1, further comprising a sensor;
wherein the instructions cause the electronic device to:
identify, based on data obtained by using the sensor, motion of the electronic device; and
obtain, based on identifying the motion of the electronic device, a video as the preview image.

7. The electronic device of claim 1, wherein the subject includes a first subject and a second subject different from the first subject,
wherein the instructions cause the electronic device to:
identify, in the image frames, a feature point of the second subject;
identify, based on identifying the feature point, a moving direction associated with the feature point of the second subject in the image frames; and
track, based on identifying the moving direction associated with the feature point of the second subject, the first subject.

8. The electronic device of claim 1, wherein the instructions cause the electronic device to:
based on identifying the subject classified to an animal, identify, in the first area, the second area where a head of the animal is captured.

9. A method of an electronic device, comprising:
receiving, while displaying a preview image through the display based on at least a portion of image frames obtained through the camera, an input with respect to a preset button;
switching to an auto framing mode in response to the input;
identifying a first area matched to a subject captured by the camera, and a second area that includes a preset portion of the subject and is a portion of the first area;
identifying a first coordinate value which is a center of the first area and a second coordinate value which is a center of the second area;
identifying, based on the first coordinate value and the second coordinate value, a vector extended from the center of the first area to the center of the second area in a same image frame; and
based on predicting a moving direction of the subject in the image frames by the vector, displaying the preview image by performing cropping with respect to at least one of the image frames.

10. The method of claim 9, wherein the displaying comprises:
determining one point forming an edge of the image frames as an origin of coordinate system; and
identifying, based on the determined point, the first coordinate value and the second coordinate value.

11. The method of claim 10, wherein the displaying comprises:
obtaining, based on the first coordinate value and the second coordinate value, a weight to be applied to the vector.

12. The method of claim 9, wherein the displaying comprises:
assigning, based on identifying the subject that is a first subject and a second subject that is different from the first subject in the image frames, a first identifier and a second identifier to the first subject and the second subject, respectively.

13. The method of claim 12, wherein the displaying comprises:
performing, based on assigning the first and second identifiers to the first and second subjects identified in the image frames, cropping to include the first and second subjects.

14. The method of claim 9, further comprises:
identifying, based on data obtained by using a sensor, motion of the electronic device; and
obtaining a video as the preview image based on identifying the motion of the electronic device.

15. The method of claim 9, wherein the subject includes a first subject and a second subject different from the first subject,
wherein the method further comprises:
identifying, in the image frames, a feature point of the second subject;
identifying, based on identifying the feature point, a moving direction associated with the feature point of the second subject in the image frames; and
tracking, based on identifying the moving direction associated with the feature point of the second subject, the first subject.

16. The method of claim 9, further comprises:
based on identifying the subject classified to an animal, identifying, in the first area, the second area where a head of the animal is captured.

17. A computer-readable storage medium storing one or more programs, wherein the one or more programs, when executed by a processor of an electronic device, cause the processor to:
- receive, while displaying a preview image through the display based on at least a portion of image frames obtained through the camera, an input with respect to a preset button;
- switch to an auto framing mode in response to the input;
- identify a first area matched to a subject captured by the camera, and a second area that includes a preset portion of the subject and is a subset of the first area;
- identify a first coordinate value which is a center of the first area and a second coordinate value which is a center of the second area;
- identify, based on the first coordinate value and the second coordinate value, a vector extended from the center of the first area to the center of the second area in a same image frame; and
- based on predicting a moving direction of the subject in the image frames by the vector, display the preview image by performing cropping with respect to at least one of the image frames.

18. The computer-readable storage medium of claim 17, wherein the one or more programs, when executed by a processor of an electronic device, cause the processor to:
- determine one point forming an edge of the image frames as an origin of coordinate system; and
- identify, based on the determined point, the first coordinate value and the second coordinate value.

19. The computer-readable storage medium of claim 18, wherein the one or more programs, when executed by a processor of an electronic device, cause the processor to:
- obtain, based on the first coordinate value and the second coordinate value, a weight to be applied to the vector.

20. The computer-readable storage medium of claim 17, wherein the subject includes a first subject and a second subject different from the first subject,
- wherein the one or more programs, when executed by a processor of an electronic device, cause the processor to:
- assign, based on identifying the first subject and the second subject in the image frames, a first identifier and a second identifier to the first subject and the second subject, respectively.

* * * * *